US012093877B2

(12) United States Patent
Moriyama et al.

(10) Patent No.: US 12,093,877 B2
(45) Date of Patent: Sep. 17, 2024

(54) PROJECTION INSTRUCTION DEVICE, PROJECTION INSTRUCTION SYSTEM, AND PLAN DATA MANAGEMENT SYSTEM

(71) Applicant: PANASONIC INTELLECTUAL PROPERTY MANAGEMENT CO., LTD., Osaka (JP)

(72) Inventors: Takaaki Moriyama, Kanagawa (JP); Daisuke Hagiwara, Tokyo (JP); Takefumi Takagi, Kanagawa (JP); Koshi Tanaka, Kanagawa (JP); Takaaki Idera, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 349 days.

(21) Appl. No.: 17/639,727

(22) PCT Filed: Aug. 28, 2020

(86) PCT No.: PCT/JP2020/032670
§ 371 (c)(1),
(2) Date: Mar. 2, 2022

(87) PCT Pub. No.: WO2021/044976
PCT Pub. Date: Mar. 11, 2021

(65) Prior Publication Data
US 2022/0292437 A1 Sep. 15, 2022

(30) Foreign Application Priority Data
Sep. 3, 2019 (JP) .................................. 2019-160643

(51) Int. Cl.
*G06Q 10/083* (2024.01)
*G06Q 10/0833* (2023.01)
(Continued)

(52) U.S. Cl.
CPC ....... *G06Q 10/083* (2013.01); *G06Q 10/0833* (2013.01); *G06Q 10/08355* (2013.01); *G06T 7/001* (2013.01)

(58) Field of Classification Search
CPC ....... B07C 3/00; B07C 2301/005; B07C 5/16; B07C 5/3412; G06T 7/001; G06Q 10/083; G06Q 10/0833; G06Q 10/08355
See application file for complete search history.

(56) References Cited

U.S. PATENT DOCUMENTS 6,795,823 B1 * 9/2004 Aklepi ................... G06Q 10/08
709/239
7,090,134 B2 8/2006 Ramsager
(Continued)

FOREIGN PATENT DOCUMENTS

EP 3434623 1/2019
JP 10-109584 4/1998
(Continued)

OTHER PUBLICATIONS

International Search Report (ISR) from International Searching Authority (Japan Patent Office) in International Pat. Appl. No. PCT/JP2020/032670, dated Nov. 10, 2020, together with an English language translation.
(Continued)

*Primary Examiner* — Daniel G Mariam
(74) *Attorney, Agent, or Firm* — Greenblum & Bernstein, P.L.C.

(57) ABSTRACT

This projection instruction device instructs an image projection device to project an image onto a package and includes a processor, a memory that stores package identification information that identifies each of a plurality of packages to be delivered, and a communication circuit that communicates with a server. The processor generates, in cooperation with the memory, a first projection image indi-
(Continued)

cating the corresponding package sorting based on the package identification information for each package stored in the memory, and instructs the image projection device to project the first projection image. Upon receiving an external instruction having change to the package identification information from the server, the processor generates a second projection image indicating the corresponding package sorting based on the changed package identification information, and instructs the image projection device to project the second projection image.

10 Claims, 14 Drawing Sheets

(51) Int. Cl.
*G06Q 10/0835* (2023.01)
*G06T 7/00* (2017.01)

(56) References Cited

U.S. PATENT DOCUMENTS

| | | | | |
|---|---|---|---|---|
| 7,516,889 | B2* | 4/2009 | Baldassari | G06Q 10/087 |
| | | | | 235/487 |
| 11,257,176 | B1* | 2/2022 | Baldassari | G06F 3/0482 |
| 2004/0182925 | A1 | 9/2004 | Anderson et al. | |
| 2004/0195320 | A1 | 10/2004 | Ramsager | |
| 2006/0159306 | A1 | 7/2006 | Anderson et al. | |
| 2006/0159307 | A1 | 7/2006 | Anderson et al. | |
| 2017/0066597 | A1 | 3/2017 | Hiroi | |
| 2017/0109696 | A1* | 4/2017 | Serjeantson | G06Q 30/0217 |
| 2019/0084009 | A1 | 3/2019 | Moriyama et al. | |
| 2019/0099783 | A1 | 4/2019 | Ohtsubo et al. | |
| 2020/0041329 | A1 | 2/2020 | Shike | |
| 2020/0290093 | A1 | 9/2020 | Moriyama et al. | |

FOREIGN PATENT DOCUMENTS

| | | |
|---|---|---|
| JP | 2001-334864 | 12/2001 |
| JP | 2002-338015 | 11/2002 |
| JP | 2007-523811 | 8/2007 |
| JP | 2011-051721 | 3/2011 |
| JP | 3186690 | 10/2013 |
| JP | 2014-094794 | 5/2014 |
| JP | 2015-113187 | 6/2015 |
| JP | 2017-171445 | 9/2017 |
| JP | 2017-171448 | 9/2017 |
| JP | 2017-185430 | 10/2017 |
| JP | 2019-117513 | 7/2019 |
| WO | 2004/079546 | 9/2004 |
| WO | 2015/145982 | 10/2015 |
| WO | 2018/124144 | 7/2018 |
| WO | 2019/064805 | 4/2019 |

OTHER PUBLICATIONS

Written Opinion (WO) from International Searching Authority (Japan Patent Office) in International Pat. Appl. No. PCT/JP2020/032670, dated Nov. 10, 2020, together with an English language translation.

Extended European Search Report (EESR) from European Patent Office (EPO) in European Patent Appl. No. 20859737.7, dated Sep. 7, 2022.

Office Action from Japan Patent Office (JPO) in Japanese Patent Appl. No. 2020-187989, dated Jun. 27, 2023, together with an English language translation.

* cited by examiner

FIG. 4

| | INFORMATION | PACKAGE CAPACITY RATIO | | PACKAGE AMOUNT RATIO |
|---|---|---|---|---|
| 1 | ○○-○○ △△×× 20 m² | | 31 % | 32/100 |
| 2 | ○×-△○ ○△××× 30 m² | | 14 % | 25/150 |
| 3 | △×-△○ ××△○×× 25 m² | | 21 % | 27/250 |
| 4 | ××-△○ ×××△○○○ 30 m² | | 17 % | 25/210 |
| 5 | △×-×○ △○×△○ 20 m² | | 33 % | 32/99 |

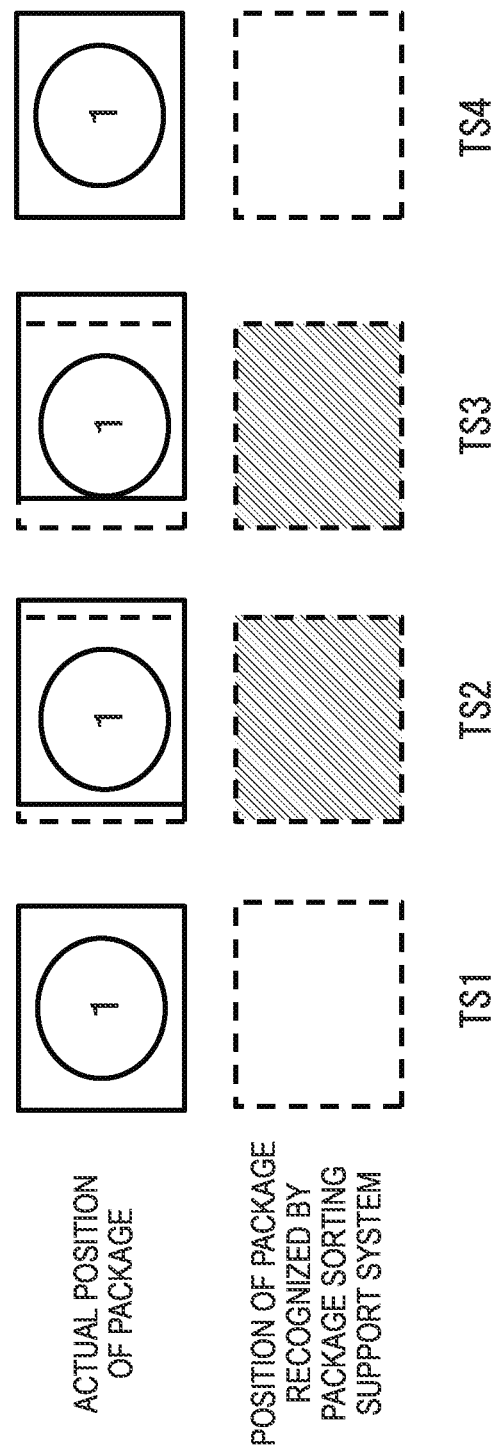

PROJECTION INSTRUCTION DEVICE, PROJECTION INSTRUCTION SYSTEM, AND PLAN DATA MANAGEMENT SYSTEM

TECHNICAL FIELD

The present disclosure relates to a projection instruction device, a projection instruction system, and a plan data management system that support package sorting.

BACKGROUND ART

With a rise of economic activities in recent years, a distribution amount of packages is increasing. In a package distribution process, sorting work of sorting packages according to destinations tends to be manual work, which is time-consuming depending on proficiency of workers. In supply chain management (SCM), package distribution is a very important factor, and efficiency of SCM is expected to be improved by improving efficiency of package sorting work. In view of such circumstances, a technique of automating at least a part of the sorting work has also been proposed (for example, see Patent Literature 1).

Patent Literature 1 discloses a system that tracks a moving package, determines an image to be displayed based on information on the package and information on a position of the package read from the package, projects the image from a projector onto the package, and displays the image on the package.

CITATION LIST

Patent Literature

Patent Literature 1: US7090134B

SUMMARY OF INVENTION

Technical Problem

According to a technique of Patent Literature 1, a worker in charge of package sorting can sort the package so as to move the package to a segment provided for each predetermined destination of the package according to the image projected from the projector. However, when an external instruction such as an addition, a change, or a deletion of information on the package to be delivered is suddenly issued for a predetermined content at a site of package sorting work, it is difficult for the worker at the site to respond to the package sorting work according to the external instruction. Even when such an external instruction is suddenly issued, it is expected that a more satisfactory SCM can be provided as long as the package sorting work can be efficiently handled. In a disclosure of Patent Literature 1, there is no technical consideration regarding improvement in efficiency of the sorting work when the external instruction such as the addition, the change, or the deletion of the information on the above-described package is suddenly issued, and there is room for improvement in this respect as compared with the related art.

An object of the present disclosure is to provide a projection instruction device, a projection instruction system, and a plan data management system that adaptively support efficiency improvement of package sorting work and delivery even when there is an external instruction such as an addition, a change, or a deletion of information on packages to be sorted, and contribute to efficiency improvement of package distribution.

Solution to Problem

The present disclosure provides a projection instruction device that instructs an image projection device to project a projection image onto a package. The projection instruction device includes: a processor; a memory that stores package identification information for identifying each of a plurality of packages to be delivered; and a communication circuit that communicates with a server. The processor cooperates with the memory to generate a first projection image indicating sorting of a corresponding package based on the package identification information for each of the plurality of packages stored in the memory and instruct the image projection device to project the first projection image, and in a case of receiving an instruction including a change in the sorting of the corresponding package from the server, generate a second projection image indicating the sorting of the corresponding package and instruct the image projection device to project the second projection image instead of the first projection image.

In addition, the present disclosure provides a projection instruction system in which a projection instruction device that instructs an image projection device to project a projection image onto a package and a server are communicably connected to each other. The projection instruction device includes a memory that stores package identification information for identifying each of a plurality of packages to be delivered, and the projection instruction device generates a first projection image indicating sorting of a corresponding package based on the package identification information for each of the plurality of packages stored in the memory and instructs the image projection device to project the first projection image. The server transmits an instruction including a change in the sorting of the corresponding package to the projection instruction device. In a case of receiving the instruction from the server, the projection instruction device generates a second projection image indicating the sorting of the corresponding package and is instructs the image projection device to project the second projection image instead of the first projection image.

In addition, the present disclosure provides a plan data management system in which a sensor device and a server are communicably connected to each other. The sensor device detects information on a package corresponding to each of a plurality of packages conveyed on a conveyance device and sends the information to the server. The server includes a memory that stores plan data related to delivery of each of the plurality of packages, and the server updates the plan data stored in the memory based on the information on the package transmitted from the sensor device, and outputs the updated plan data to an external control device connected to the server.

Advantageous Effects of Invention

According to the present disclosure, even when there is an external instruction such as an addition, a change, or a deletion of information on a package to be sorted, efficiency of package sorting work and delivery can be adaptively supported, and efficiency of package distribution can be improved.

BRIEF DESCRIPTION OF DRAWINGS

FIG. 4 is a view showing a UI screen displayed on a display unit of a truck transport management device.

FIG. 17 is an explanatory view of an example of a projection position onto a package.

DESCRIPTION OF EMBODIMENTS

Hereinafter, exemplary embodiments specifically disclosing a projection instruction device, a projection instruction system, and a plan data management system according to the present disclosure will be described in detail with reference to the drawings as appropriate. However, unnecessarily detailed description may be omitted. For example, detailed description of a well-known matter or repeated description of substantially the same configuration may be omitted. This is to avoid unnecessary redundancy in the following description and to facilitate understanding of those skilled in the art. The accompanying drawings and the following description are provided for a thorough understanding of the present disclosure by those skilled in the art, which are not intended to limit the subject matter recited in the claims.

Figure 1:
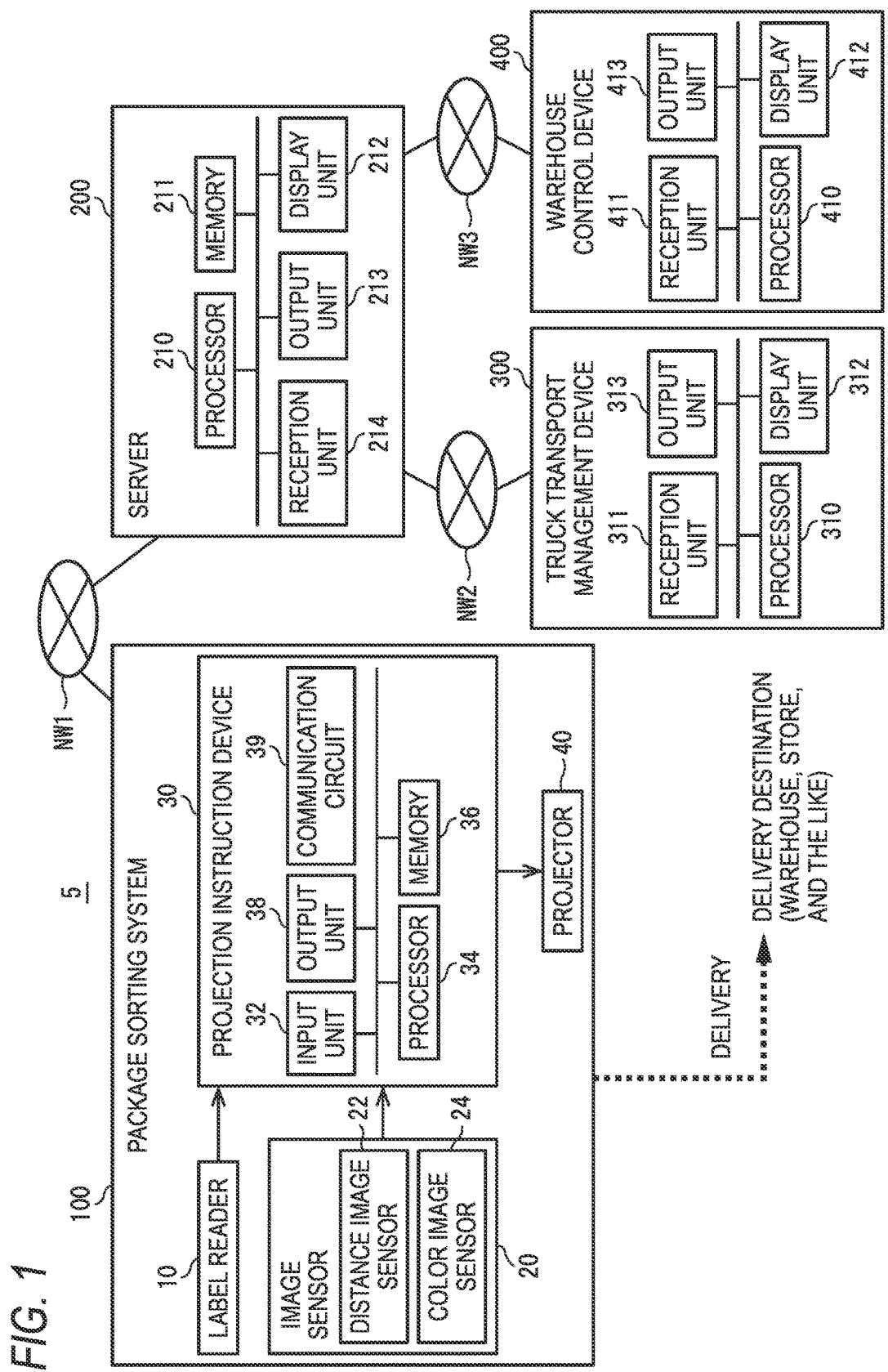
FIG. 1 is a block diagram showing an example of a configuration of a projection instruction system according to a first embodiment.

FIG. 1 is a block diagram showing an example of a configuration of a projection instruction system 5 according to a first embodiment. The projection instruction system 5 includes at least a package sorting system 100 and a server 200. The projection instruction system 5 may further include a truck transport management device 300 and a warehouse control device 400.

The package sorting system 100 is installed in, for example, a distribution center. The package sorting system 100 includes a label reader 10, an image sensor 20, a projection instruction device 30, and a projector 40 (an example of an image projection device). The package sorting system 100 supports work of a worker who sorts one or more packages conveyed by a conveyance conveyor for each delivery destination (destination). The conveyance conveyor may be, for example, a belt conveyor or a roller conveyor.

The distribution center in which the package sorting system 100 is installed is owned by, for example, a retailer, a wholesaler, or an Internet distributor. The package to be sorted is generally corrugated cardboard having a substantially rectangular parallelepiped shape in which a product or the like to be delivered is packed, but an outer shape thereof is not particularly limited, and a type of the package is not particularly limited. A configuration of the package sorting system 100 is not limited to a configuration shown in FIG. 1. For example, the number of components can be appropriately changed according to a purpose of sorting, such as connecting a plurality of image sensors 20, projection instruction devices 30, and projectors 40 to one label reader 10.

The label reader 10 is a device including optical components such as a lens and an image sensor. The label reader 10 can read label recording information in which various types of information on a package are recorded from a label attached to the package conveyed by the conveyance conveyor. The package can be identified by using the read label recording information. Package identification information (in particular, package identification information before update) is defined by the information read from the label.

The image sensor 20 is an imaging device including optical components such as a lens and an image sensor. The image sensor 20 is generally configured as an imaging camera. The imaging camera is a three-dimensional camera, a plurality of two-dimensional cameras, or the like. The image sensor 20 includes a distance image sensor 22 and a color image sensor 24.

The distance image sensor 22 captures an image of a package conveyed by the conveyance conveyor to generate a distance image. The generated distance image is used as information indicating a position of the package, a distance to the package, a size of the package, and the like. The "distance image" refers to an image having distance information indicating a distance from an imaging position to a position (including a surface of a package) indicated by pixels (that is, in the present disclosure, the term "image" includes the distance image). In addition, the term "distance image" includes a table listing numerical values indicating distances, which cannot be recognized as an image by human eyes. That is, the "distance image" may be information indicating a relationship between coordinates and the distance in the captured area, and a data structure thereof is not limited. In the present disclosure, the distance image sensor 22 is used to identify the position of the package. Therefore, the distance image sensor 22 may be replaced with another sensing device (an ultrasonic sensor, an infrared sensor, a stereo camera, or a monocular video camera).

The color image sensor 24 captures an image of the package whose distance image is generated to generate a color image. The "color image" refers to an image in which a color of the surface of the package is expressed by a predetermined gradation, and the "gradation" includes not only 256 gradations of RGB but also all gradations such as a gray scale. In the present disclosure, the color image sensor 24 is used to track each package identified by the distance image sensor 22. The color image sensor 24 may also be replaced with another sensing device (an ultrasonic sensor, an infrared sensor, a stereo camera, or a monocular video camera).

That is, in the present disclosure, the term "image" includes both the distance image and the color image. In the present disclosure, information output from an image sensor as a sensing device including a distance image sensor and a color image sensor is referred to as sensing information. In the present embodiment, the image sensor 20 (including the distance image sensor 22 and the color image sensor 24) are described as an example of a sensing device. In the present embodiment, the distance image output from the distance image sensor 22 and the color image output from the color image sensor 24 are described as examples of the sensing information.

The projection instruction device 30 serves as a computing device in the package sorting system 100. The projection instruction device 30 includes an input unit 32, a processor 34, a memory 36, and an output unit 38 that are connected via a bus. The input unit 32 receives the package identification information capable of identifying the package, which is acquired from the label recording information read by the label reader 10, the distance image generated by the distance image sensor 22, and the color image generated by the color image sensor 24. The processor 34 is configured by a general computing device, and generates a projection image to be projected on the package based on the package identification information, the distance image, and the color image. In the memory 36 as a storage device, the processor 34 performs operations such as reading a control program required for various types of processing and saving data. That is, the processor 34 and the memory 36 cooperate with each other to control various types of processing executed by the projection instruction device 30. The output unit 38 outputs the projection image generated by the processor 34 to the projector 40. In the present disclosure, the "processor" does not mean only a single processor. The "processor" is also used as a term meaning an operation subject when a plurality of processors having the same purpose or processors having different purposes (for example, a general-purpose central processing unit (CPU) and a graphical processing unit (GPU)) execute processing in cooperation with each other.

The projector 40 is configured by a general image projection device, projects projection light including the projection image received from the projection instruction device 30 on the package, and displays the projection image on the package.

The package sorting system 100 can be constructed by connecting the label reader 10, the image sensor 20 (the distance image sensor 22 and the color image sensor 24), the projection instruction device 30, and the projector 40 by wired communication or wireless communication. Two or more of the label reader 10, the image sensor 20, the projection instruction device 30, and the projector 40 may be constructed as an integrated device. For example, the image sensor 20 and the projector 40 may be combined to form an integrated imaging projection device (see FIG. 2).

The server 200 includes a processor 210, a memory 211, a display unit 212, an output unit 213, and a reception unit 214. The server 200 may further include a storage unit (not shown) such as a recording device. The processor 210 comprehensively controls an operation of the server 200. For example, the processor 210 executes programs held in the memory 211 to implement various functions including signal processing, input and output processing, computing processing, storage processing, and the like. The processor 210 may include a micro processing unit (MPU), a central processing unit (CPU), a digital signal processor (DSP), a graphical processing unit (GPU), and the like. The server 200 may be a general computer, and may be integrated with or separate from the package sorting system 100. The server 200 and the package sorting system 100 may be installed at the same place or at separate places. At least a part of processing of the server 200 described in the present embodiment may be executed by the package sorting system 100 (for example, the projection instruction device 30).

The memory 211 includes a primary storage device (for example, a random access memory (RAM) or a read only memory (ROM)). The storage unit (not shown) may include a secondary storage device (for example, a hard disk drive (HDD) or a solid state drive (SSD)) or a tertiary storage device (for example, an optical disk or an SD card). The memory 211 stores various types of data, information, and programs.

The display unit 212 may include a liquid crystal display device, an organic electronic luminescent (EL) device, or other display devices. The display unit displays various types of data and information.

The output unit 213 and the reception unit 214 constitute a communication circuit in which the output unit 213 executes transmission processing and the reception unit 214 executes reception processing. The communication circuit performs communication in a wireless or wired manner. A communication method of the communication circuit may include, for example, communication methods such as a wide area network (WAN), a local area network (LAN), power line communication, short-distance wireless communication (for example, Bluetooth (registered trademark) communication), and communication for a mobile phone. The communication circuit communicates various types of data and information. The communication circuit includes a network interface connectable to a network NW, a short-distance wireless communication interface, and the like.

The output unit 213 and the reception unit 214 communicate with the package sorting system 100 via a network NW1. The output unit 213 and the reception unit 214 communicate with the truck transport management device 300 via a network NW2. The output unit 213 and the reception unit 214 communicate with the warehouse control device 400 via a network NW3.

The server 200 can receive weather information and traffic information (including traffic jam information) from an external institution (for example, Japan Meteorological Agency, or Japan Road Traffic Information Center). The server 200 is connected to the external institution via one of the networks NW1, NW2, NW3. The server 200 can receive truck arrangement status information, route information of each truck, and loading amount information of a truck being sorted (loaded) from the truck transport management device 300. The loading amount information of the truck may be daily information in addition to real-time information. The server 200 can receive information such as the number of workers in a warehouse, a work level, and the number of packages for each delivery destination from the warehouse control device 400. The work level includes a sorting level, a speed, a sorting amount, an average conveyor speed, and the like of each worker. These pieces of information may be created and held by the package sorting system 100 and provided to the server 200.

The server 200 can receive information on a package capacity (which may include a package capacity for each delivery destination and information on a loading rate of a truck), a real-time sorting status, and an achievement degree of the packages from the package sorting system 100. The package capacity is a value representing a size of the packages calculated based on the size of the package. The server 200 can receive, as package information, package attention information (attention to handling, fragile item, or the like) and destination information (the destination may be changed on the way).

The truck transport management device 300 includes a processor 310, a display unit 312, an output unit 313, and a reception unit 311. The processor 310 comprehensively controls an operation of the truck transport management device 300. The processor 310 includes a built-in memory and implements various functions by executing programs stored in the memory, for example. The processor may include a micro processing unit (MPU), a central processing unit (CPU), a digital processor (DSP), a graphical processing unit (GPU), and the like.

The output unit 313 and the reception unit 311 constitute a communication circuit in which the output unit 313 executes transmission processing and the reception unit 311 executes reception processing. The communication circuit performs communication in a wireless or wired manner. A communication method of the communication circuit may include, for example, communication methods such as a wide area network (WAN), a local area network (LAN), power line communication, short-distance wireless communication (for example, Bluetooth (registered trademark) communication), and communication for a mobile phone. The communication circuit communicates various types of data and information. The communication circuit includes a network interface connectable to the network NW, a short-distance wireless communication interface, and the like. The output unit 313 and the reception unit 311 communicate with the server 200 via the network NW2.

The display unit 312 displays a user interface (UI) screen 350 (see FIG. 4) that displays a loading status of the truck. The display unit 312 may include a liquid crystal display device, an organic electronic luminescent (EL) device, or other display devices. The display unit 312 displays various other types of data and information.

The warehouse control device 400 includes a processor 410, a display unit 412, an output unit 413, and a reception unit 411. The processor 410 comprehensively controls an operation of the warehouse control device 400. The processor 410 includes a built-in memory and implements various functions by executing programs stored in the memory, for example. The processor may include a micro processing unit (MPU), a central processing unit (CPU), a digital processor (DSP), a graphical processing unit (GPU), and the like.

The output unit 413 and the reception unit 411 constitute a communication circuit in which the output unit 413 executes transmission processing and the reception unit 411 executes reception processing. The communication circuit performs communication in a wireless or wired manner. A communication method of the communication circuit may include, for example, communication methods such as a wide area network (WAN), a local area network (LAN), power line communication, short-distance wireless communication (for example, Bluetooth (registered trademark) communication), and communication for a mobile phone. The communication circuit communicates various types of data and information. The communication circuit includes a network interface connectable to the network NW, a short-distance wireless communication interface, and the like. The output unit 413 and the reception unit 411 communicate with the server 200 via the network NW3.

The display unit 412 displays a status of the warehouse. The display unit 412 may include a liquid crystal display device, an organic electronic luminescent (EL) device, or other display devices. The display unit 412 displays various other types of data and information.

Although the projection instruction system 5 includes the server 200, the truck transport management device 300, and the warehouse control device 400 as separate devices in the first embodiment, the server may include the truck transport management device and the warehouse control device. In the present embodiment, the networks NW1, NW2, NW3 are configured by separate networks, and may be configured by the same network.

Figure 2:
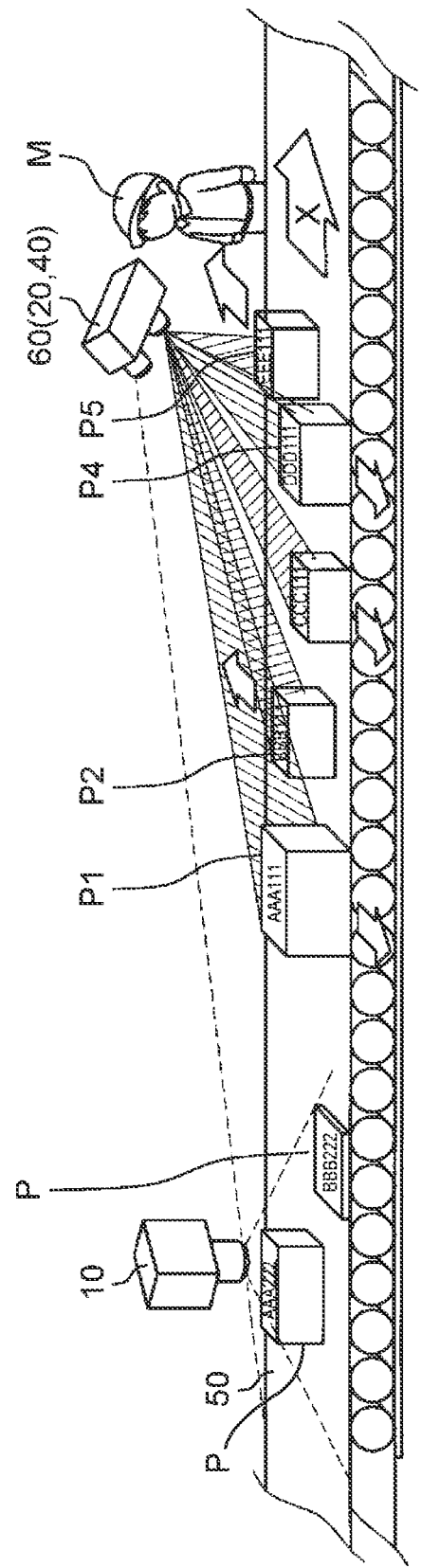
FIG. 2 is a conceptual view showing a status in which a package sorting system installed in a distribution center is operating.

FIG. 2 is a conceptual view showing a status in which the package sorting system 100 installed in the distribution center is operating. The label reader 10 disposed above the conveyance conveyor 50 reads a label attached to each package P conveyed by the conveyance conveyor 50. The label describes label recording information including various types of information on the package. The label recording information includes information similar to a package identification number, a name, an address and a telephone number of a sender, a name, an address and a telephone number of a recipient, a type of the package, and the like, which are individually assigned to the package. Reading of the label may be performed by a worker in charge by manually placing a barcode reader as the label reader 10 on a barcode in the label.

Further, the image sensor 20 captures an image (a distance image and a color image) of the package P conveyed by the conveyance conveyor 50, and acquires information such as a position of the package P, a distance to the package P, a size of the package P (lengths of three sides when the package P is a rectangular parallelepiped), a color of the package P, a pattern of the package P, and the like. Arrangement positions of the label reader 10 and the image sensor 20, a type of the sensing device, and an order of processing are not particularly limited to those shown in the drawings. In this example, the image sensor 20 and the projector 40 are constructed as an integrated imaging projection device 60, and are disposed above the conveyance conveyor 50.

The projection instruction device 30 is configured by, for example, a computer disposed in vicinity of the conveyance conveyor 50 or in another room, and generates a projection image to be displayed on the package P (for example, an upper surface when the package P is a rectangular parallelepiped) based on information identifying the package acquired by the label reader 10 and the distance image and the color image generated by the image sensor 20. The projection instruction device 30 transmits, to the projector 40, a projection instruction to project the projection image on the package P. Upon receiving the projection instruction, the projector 40 projects projection light including the projection image generated by the projection instruction device 30 on the package P, and displays the projection image on the package P.

In the present disclosure, the "image projection device" is not limited to a device that directly projects a light beam onto a package. In the present disclosure, the "image projection device" also includes eyeglasses capable of displaying an image. That is, in the present disclosure, when an expression such as projecting the projection light onto the package, displaying the image on the package, or projecting the image on the package is used, the expression also includes causing the worker to recognize that the projection light is projected onto the package in a pseudo manner via glasses capable of displaying the image. That is, when the worker wears special glasses capable of displaying the image, the projection image here may be superimposed on an image of the package P visually recognized via the glasses.

A worker M in charge of picking up the package stands beside the conveyance conveyor 50, picks up the package that has reached an area of the worker M from the conveyance conveyor 50, and loads the package onto a standby truck.

For example, a label attached to the package P1 includes package identification information of "AAA111", for example, as label recording information. The package identification information of "AAA111" identifies that the package is to be sorted in a specific area. Therefore, when the package P1 arrives at the specific area, the processor 34 transmits data of a projection image generated based on the package identification information of the package P1 to the projector 40. The projector 40 projects the projection image on the package P1.

(Overview of Operation)

Figure 16:
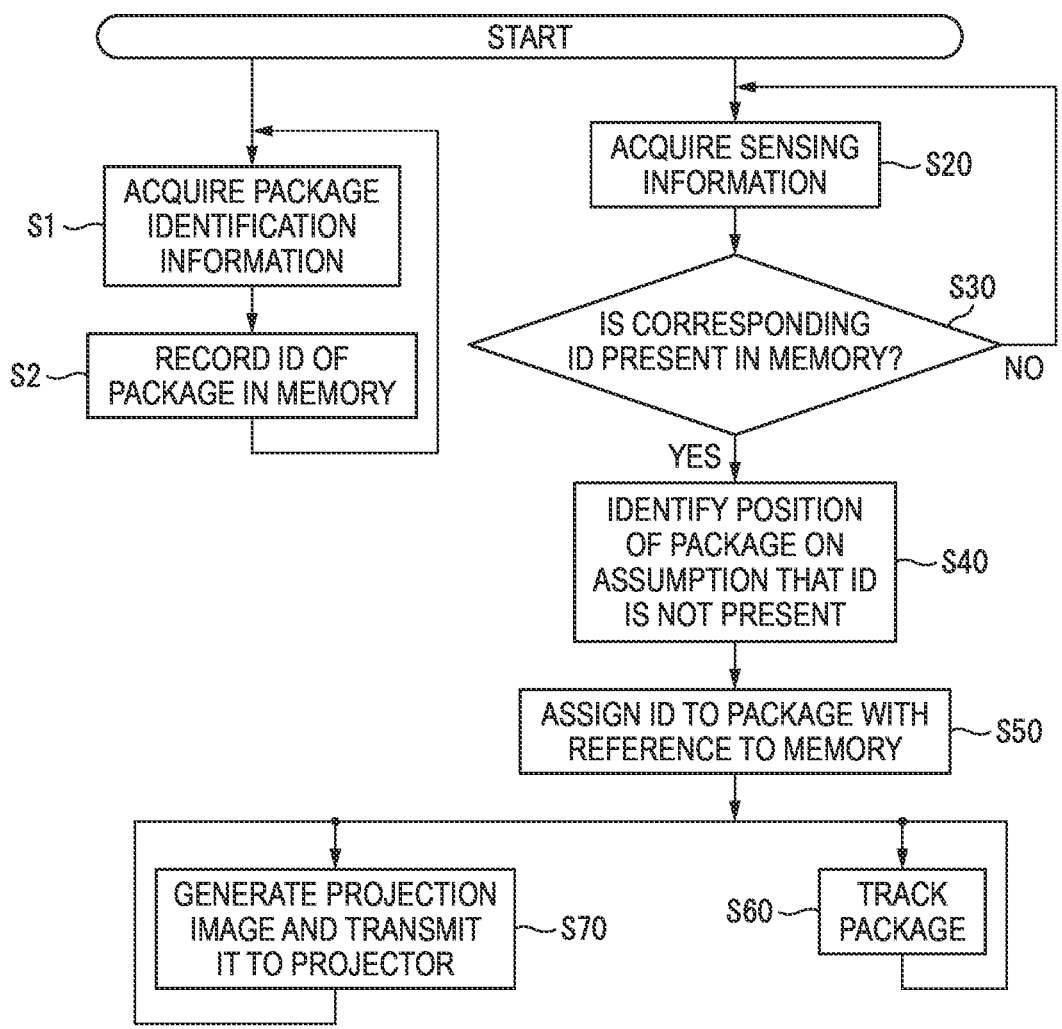
FIG. 16 is a flowchart showing an example of a schematic procedure of an operation mainly performed by a projection instruction device.

Hereinafter, a basic operation of the package sorting system 100 will be described. FIG. 16 is a flowchart showing an example of a schematic procedure of an operation mainly performed by the projection instruction device 30 according to the first embodiment, in particular, the processor 34 of the projection instruction device 30.

In FIG. 16, first, after the label recording information on the label of the package is read by the label reader 10, the input unit 32 of the projection instruction device 30 acquires the package identification information corresponding to the label recording information from the label reader 10 (S1). The package identification information is information including at least one of a package identification number, a name, an address and a telephone number of a sender, a name, an address and a telephone number of a recipient, a type of package, and the like, which are individually assigned to the package. The processor 34 assigns an ID as the package identification number for identifying the package to the package identification information, and records the ID in the memory 36 together with time point information corresponding to a time point at which the ID is assigned (S2). The ID recorded in the memory 36 may be the package identification number originally recorded in the package identification information, or the projection instruction device 30 may generate and assign a new ID.

On the other hand, in parallel with steps S1 and S2, after an image of the package is captured by the image sensor 20, the input unit 32 of the projection instruction device 30 acquires the image as sensing information from the image sensor 20 (S20). The processor 34 determines whether the ID corresponding to the package present in the image is present in the memory 36 (S30).

An example of a method of determining whether the ID corresponding to the package present in the image is present in the memory 36 includes the following procedure. That is, the processor 34 calculates a time period required for the package to move between the label reader 10 and the image sensor 20 based on a distance (assumed to be known) between the label reader 10 and the image sensor 20 and a speed of the conveyance conveyor 50. Then, the processor 34 subtracts the calculated time period from the time point at which the image is acquired, so that a time point at which the package present in the image is assigned the ID by the label reader 10 (and the processor 34) can be estimated. Then, the processor 34 can estimate that the ID assigned close to the estimated time point is the ID corresponding to the package present in the image. As another example, another image sensor may be installed in vicinity of the label reader 10. That is, when the label reader 10 (and the processor 34) gives the ID, a distance between the package (and the ID) and the label reader 10 is measured at each time point by tracking the package to which the ID is assigned using another image sensor installed in the vicinity of the label reader 10. The processor 34 can estimate the ID of the package in the image acquired in predetermined step S20 based on a distance between the measured package (and ID) and the label reader 10, a distance of the package in the image acquired in step S20, and a distance (assumed to be known) between the two image sensors.

In this manner, the processor 34 determines whether the ID corresponding to the package included in the image is present in the memory 36 (S30). That is, as described in step S2, the package identification information, the ID, and the time point information corresponding to the time point at which the ID is assigned are recorded in advance in the memory 36. On the other hand, for example, as described above, the processor 34 subtracts (that is, subtracts) the time period required for the package to move between the label reader 10 and the image sensor 20 from the time point at which the image is acquired, so that the time at which the ID of the package present in the image is assigned by the label reader 10 (and the processor 34) can be estimated. The processor 34 compares the time point information recorded in advance in the memory 36 with the estimated time point, and when these values are close to each other (for example, when a time period difference is equal to or shorter than a predetermined threshold time period), the processor 34 can determine that the ID corresponding to the package included in the image is present in the memory 36. When it is determined that the ID corresponding to the package is present in the memory 36 (S30; Yes), the processing proceeds to step S60 and the subsequent steps.

When it is determined that the ID corresponding to the package is not present in the memory 36 (S30; No), the processor 34 identifies a position of the package again on an assumption that the ID is not assigned to the package (S40), and assigns the ID to the package (S50). Steps S30 to S50 will be described in more detail later.

The processor 34 tracks the ID-assigned package conveyed and moved by the conveyance conveyor 50 based on the image from the image sensor 20 acquired by the input unit 32 at a predetermined interval (S60). The processor 34 generates the projection image in parallel with tracking of the package, and transmits the projection image to the projector 40 (S70). The projection image may not be generated all the time, and may be generated only when the package is present in an area to be picked up. The image to be projected on the package may be switched depending on whether the package is picked up by the worker. Whether the package is picked up can be determined by analyzing the image captured by the image sensor 20. An example of the image to be projected when the package is picked up is detailed information of the package.

The projector 40 that acquires the projection image from the projection instruction device 30 projects the projection image on the corresponding package.

(Correction of Projection Position)

As shown in FIG. 16, in the package sorting system 100, processing of tracking the package (S60), generating the projection image (S70), and projecting are executed in parallel. On the other hand, since the processing required for tracking the package includes processing of acquiring and analyzing the image, a load is generally larger than that of the processing of generating the projection image. Therefore, when the projection image is projected in accordance with the position of the package updated by the tracking of the package, a position where the projection image is projected is updated only by an update frequency of the tracking of the package. As a result, from a viewpoint of the worker, the projection image appears to suddenly move after stopping for a certain period of time (a period of time required for updating the position by tracking the package).

FIG. 17 is a view schematically showing this problem. FIG. 17 is an explanatory view of an example of a projection position on a package. In FIG. 17, a solid line in an upper part indicates an actual position of the package, and broken lines in the upper part and a lower part indicate a position of the package recognized by the package sorting system 100 through the processing of tracking the package. TS1 to TS4 are time stamps indicating time points.

FIG. 17 shows a transition assuming that a cycle of tracking the package is every three time points and the processing of projecting the package is executed at each time point. That is, at the time point TS2 and the time point TS3, the position of the package is not updated (indicated by oblique lines in the lower part of FIG. 17), while the package moves from time to time and a projection image is projected at each time point. As a result, as shown in the upper part of FIG. 17, at the time point TS2 and the time point TS3, the position where the projection image is projected is shifted from the actual position of the package. Then, when the position of the package is updated at the time point TS4, the position where the projection image is projected suddenly moves.

In order to solve this problem, in the package sorting system 100, processing of correcting the projection position of the package is executed.

Specifically, when a movement speed of the package (a conveyance speed by the conveyance conveyor 50) is v, a movement distance D by which the package moves can be calculated by multiplying a time (current time point—time point at which position of package is updated most recently) by v. The processor 34 may calculate the movement distance D as a distance with a direction (for example, 2 cm eastward), or may calculate the movement distance D as a distance that does not particularly define a direction in a case where a movement direction of the package is substantially the same as a conveyance direction of the conveyance conveyor 50 (that is, in order to calculate the movement distance D as a distance with a direction, v may be determined by a speed with a direction). A predicted projection position of the package where the projection image is to be projected can be obtained by adding D to the position of the image. In the following description, unless otherwise specified, expressions "distance" and "speed" will be general terms for those with a direction and those without a direction.

In order to enable calculation of the distance D described above, a value of the speed v needs to be determined by estimation or actual measurement. In order to determine the value of the speed v, the following method can be adopted.

Method 1) When the package is tracked (step S60), v is calculated based on a movement distance per time unit and a direction.

Method 2) The package is considered to move at a predetermined speed and in a predetermined direction, and the speed is defined as v.

Method 3) A conveyance speed and a direction of the conveyor are monitored from an output of a motor or the like, and the speed is defined as v (assuming that a speed of the package is equal to the speed of the conveyor).

The value of v may not be calculated by any one of the methods 1) to 3), and may be determined by comprehensively evaluating results calculated by the respective methods. For example, it is conceivable that an average value of the results calculated by the respective methods 1) to 3) is defined as v.

While the speed can be estimated from a beginning of an operation of the package sorting system 100 in the method 2) in which the speed and the direction of the package are considered to be predetermined and the method 3) in which the speed is calculated based on the conveyance speed of the conveyor, the speed cannot be estimated until a certain time period elapses in the method 1) in which the speed is calculated based on a tracking result of the package. On the other hand, in the method 1), since an actual movement of the package can be reflected in the speed v regardless of the conveyance direction of the conveyor or the like, the projection position can be corrected to a position following the actual movement even when the package moves in a direction different from the conveyance direction of the conveyor due to a movement caused by collision between the packages or contact of the worker with the package. Specifically, in the method 1), the projection position can be corrected even if the package moves vertically or obliquely with respect to the conveyance direction of the conveyor or moves backward in the conveyance direction of the conveyor.

In consideration of characteristics of these methods, for example, a method to be used may be switched according to the elapsed time period, or a degree of reflection in evaluation may be changed, such as changing a weight of the weighted average. That is, advantages of the methods can be utilized by mainly using the methods 2) and 3) immediately after a start of the package sorting system 100 and mainly using the method 1) when a time period elapses.

By correcting the position where the projection image is to be projected in this manner, according to the first embodiment, the projector 40 can more accurately project the projection image on the package along the movement of the package, and projection of the image can be viewed smoothly from the human eye.

D may be calculated by multiplying (current time+$\Delta t$−time point at which position of package is updated most recently) by v. Here, $\Delta t$ can be a transmission time period of the projection image from the projection instruction device 30 to the projector 40. Alternatively, $\Delta t$ may be a delay time period due to processing in the projector. Alternatively, $\Delta t$ may be a time period obtained by adding the delay time period due to the processing in the projector to the transmission time period of the projection image from the projection instruction device 30 to the projector 40. By determining $\Delta t$ in this manner, the predicted projection position can be calculated more accurately.

Figure 3:
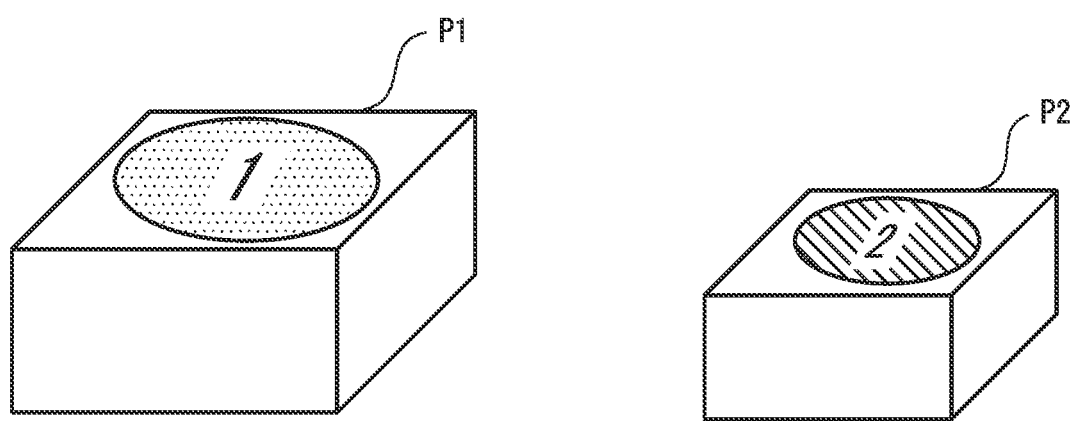
FIG. 3 is a view showing a state in which a projection image including information such as a word and a numeral is projected on an upper surface of a package.

FIG. 3 is a view showing a state in which a projection image including information such as a word and a numeral is projected on an upper surface of a package. When the worker M views the projection image projected on the package P1 and confirms that the package P1 is the package that the worker M is in charge of, the worker M loads the arrived package P1 onto a truck immediately. Therefore, sorting work can be efficiently performed. The same applies to a package P2.

FIG. 4 is a view showing the UI screen 350 displayed on the display unit 312 of the truck transport management device 300. When there is a detection (for example, an input operation by the worker or a determination based on an output of the image sensor 20) that sorting and/or loading onto the truck of the package on which the projection image is projected is completed, the projection instruction device 30 transmits package identification information including package capacity information detected by the image sensor 20 to the server 200. The server 200 acquires the package identification information including the package capacity information from the package sorting system 100 via the network NW1, and calculates a current occupied capacity of the truck in real time for each truck having a different delivery destination. The server 200 creates the UI screen 350 indicating a result of calculating a current occupied capacity of a truck for each truck, and transmits the UI screen 350 to the truck transport management device 300 or the warehouse control device 400. When the truck transport management device 300 receives data of the UI screen 350, the truck transport management device 300 displays the UI screen 350 on the display unit 312. When the warehouse control device 400 receives data of the UI screen 350, the warehouse control device 400 displays the UI screen 350 on the display unit 412. Calculation processing or the like executed by the server 200 may be executed in the package sorting system 100, the UI screen 350 indicating the result of calculating the current occupied capacity of the truck for each truck may be created, and the UI screen 350 may be transmitted to the truck transport management device 300 or the warehouse control device 400.

On the UI screen 350, a truck icon, truck information, a bar display indicating an occupied capacity of a truck, a current package capacity ratio calculated based on a size of the loaded package, and a current package amount ratio calculated based on the number of loaded packages are displayed in a plurality of rows for five trucks, for example. For example, in a case of a first truck in the uppermost row, in addition to a truck icon and truck information, a bar display indicating an occupied capacity of the truck by orange gradation, a package capacity ratio: 31%, and a package amount ratio: 32/100 are shown.

A truck delivery manager or a sorting worker can intuitively grasp a sense of a size of a package loaded on a loading bed of the truck by viewing the UI screen 350. For example, the truck delivery manager or the sorting worker can roughly grasp how many conveyed packages are to be loaded on the current truck and from which package the packages are to be loaded on the next truck, and can improve a work efficiency of his or her own. The truck delivery manager can more accurately plan the number of trucks required for loading the packages, that is, the number of trucks to be arranged, based on the current occupied capacity of the truck. For example, when the number of packages is large, the truck delivery manager can prepare the next truck. On the other hand, when the number of packages is small, the truck delivery manager does not need to prepare a standby truck. Therefore, there is no waste in truck arrangement.

A display device that displays the UI screen indicating the current occupied capacity of the truck is not limited to the display unit 312 of the truck transport management device 300, and may be the display unit 212 of the server 200, a display such as a smartphone or a tablet terminal connectable to the server 200, or a monitor connected to the projection instruction device 30.

Based on a loading status of the truck displayed on the UI screen, the truck delivery manager may perform dynamic pricing (in other words, dynamic increase in a wage to a driver of the truck) such that an income of the driver of the truck who carries a large amount of packages increases dynamically when the number of packages is large. When the number of packages is large, the projection instruction device 30 may insert a message such as "Keep it up" or "You can have a break in two minutes" on a belt conveyor so as not to overlap the package in the projection image projected by the projector 40, and may take measures such as improving a motivation of the sorting worker or changing a mood.

Next, an operation of the projection instruction system 5 according to the first embodiment will be described.

Here, a case where the projection instruction system 5 performs a package sorting operation based on the package identification information will be described. A change in the package identification information including sorting information conceptually includes an addition, a change, and a deletion.

[First Utilization Example of Projection Instruction System] (Normal Package Sorting)

Figure 5:
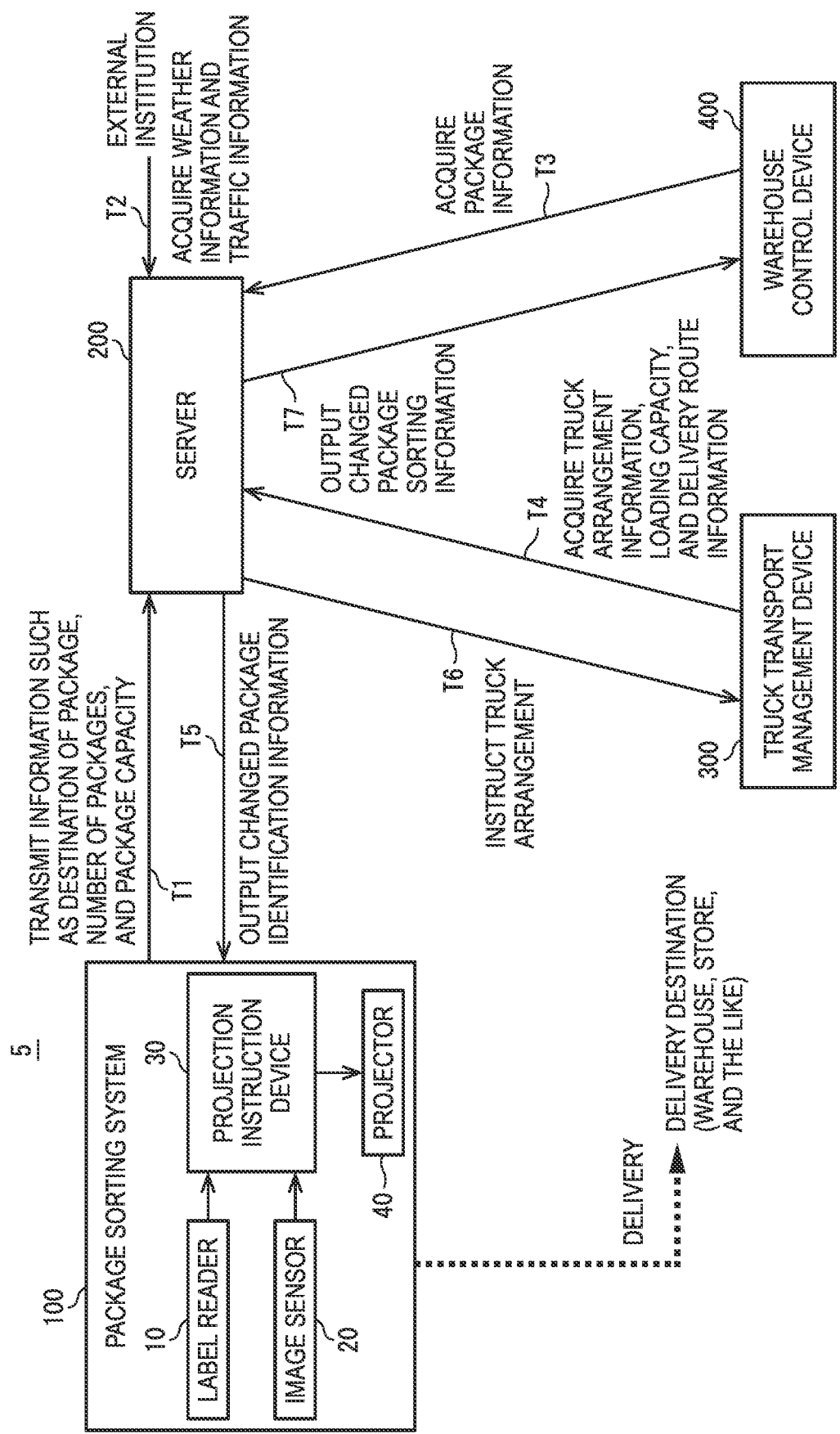
FIG. 5 is a diagram showing a procedure of a package sorting operation in the projection instruction system.

FIG. 5 is a diagram showing a procedure of a package sorting operation in the projection instruction system 5. In normal package sorting, in principle, a different person in charge sorts packages for each destination. Each person in charge determines a destination of a package based on a projection image projected on an upper surface of the package. The projection image is a circular image projected on the upper surface of the package. The circular image is filled with a different color for each destination. A person in charge number for identifying the person in charge is described in a center of the circular image. In the present embodiment, when colors of the circular images are "blue", "green", and "yellow", it indicates that destinations are "Tokyo", "Osaka", and "Hokkaido", respectively. In addition, when the person in charge numbers are "1", "2", and "3", the person in charge numbers indicate a person in charge M1 that sorts packages going to Tokyo, a person in charge M2 that sorts packages going to Osaka, and a person in charge M3 that sorts packages going to Hokkaido, respectively (see FIG. 6). In particular, when sorting destinations are not distinguished from each other, the person in charge of sorting is simply referred to as the worker M. Although the circular image is illustrated as an example of the projection image, the projection image does not necessarily have to be circular, and may have any shape such as a quadrangular shape or a polygonal shape.

The projection instruction device 30 reads a label attached to a package conveyed by conveyance conveyor by the label reader 10, and acquires package identification information including information such as a destination of the package. The projection instruction device 30 captures an image of the package conveyed by the conveyance conveyor by the image sensor 20, and acquires information such as the number of packages and a package capacity. The projection instruction device 30 transmits information such as the destination of the package, the number of packages, and the package capacity to the server 200 connected to the network NW1 by the communication circuit 39 (T1).

The processor 210 of the server 200 registers, in the memory 211, information indicating that the person in charge M1 sorts packages going to Tokyo, the person in charge M2 sorts packages going to Osaka, and the person in charge M3 sorts packages going to Hokkaido, as person in charge information for sorting normal packages. The package sorting system 100 may register, in the memory, the person in charge information for sorting normal packages.

On the other hand, the processor 210 of the server 200 periodically acquires weather information and traffic information from the external institution as external information (T2). For example, when a typhoon is predicted to come to Tokyo in the weather information, a status occurs in which packages going to Tokyo is desired to be quickly sorted. The traffic information includes traffic jam information.

The processor 210 of the server 200 acquires package information from the warehouse control device 400 via the network NW3 (T3). For example, when the number of packages going to Tokyo tomorrow is large or the number of packages going to Tokyo for one hour from now on is large, a status in which it is desired to quickly sort packages going to Tokyo occurs in the same manner.

The processor 210 of the server 200 acquires truck arrangement information, a loading capacity of a scheduled truck, and delivery route information from the truck transport management device 300 via the network NW2 (T4).

The processor 210 of the server 200 determines a change in sorting work for the worker based on the information such as the destination of the package, the number of packages, and the package capacity received from the projection instruction device 30 in the procedure T1. The processor 210 outputs the package identification information including the changed sorting information to the package sorting system 100. In the changed package identification information, for example, in order to quickly sort the packages going to Tokyo, the processor 210 instructs the package sorting system 100 via the network NW1, for the person in charge M2 of sorting the packages going to Osaka, to sort the packages going to Tokyo in addition to the packages going to Osaka (T5).

When the projection instruction device 30 of the package sorting system 100 receives the instruction via the communication circuit 39, the projection instruction device 30 instructs the projector 40 to project a projection image such that the person in charge M1 sorts the packages going to Tokyo, the person in charge M2 sorts the packages going to Osaka and the packages going to Tokyo, and the person in charge M3 sorts the packages going to Hokkaido, as the package identification information including the changed sorting information.

Figure 6:
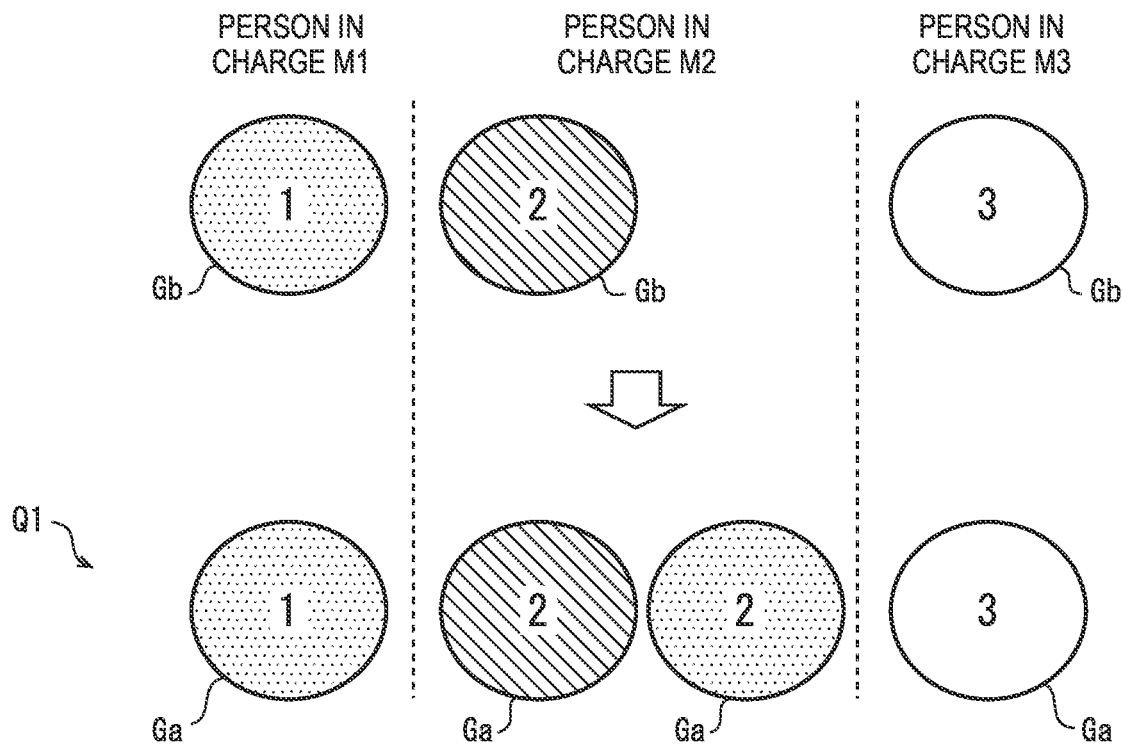
FIG. 6 is a view showing an example of a projection pattern projected on an upper surface of a package.

FIG. 6 is a view showing an example of a projection pattern Q1 projected on an upper surface of a package. In normal package sorting, the sorting of the packages to delivery destinations tends to be biased from prediction of the next day or real-time information. For example, when the number of packages going to Tokyo to be sorted by the person in charge M1 is large, the person in charge M2 in charge of the packages going to Osaka can give a hand. In the projection pattern Q1, the projector 40 projects a projection image including help on the upper surface of the package so that the person in charge M2 in charge of the packages going to Osaka sorts the packages going to Tokyo.

Here, in the package identification information including the unchanged sorting information, the projector 40 projects a projection image Gb, which is a circular image colored in blue (indicated by dots in the drawing) and having the person in charge number "1", on a package going to Tokyo that is first conveyed by the conveyance conveyor. The projector 40 projects the projection image Gb, which is a circular image colored in green (indicated by hatching in the drawing) and having the person in charge number "2", on a package going to Osaka that is second conveyed by the conveyance conveyor. The projector 40 projects the projection image Gb, which is a circular image colored in yellow (indicated in white in the drawing) and having the person in charge number "3", on a package going to Hokkaido that is third conveyed by the conveyance conveyor.

In the package identification information including the changed sorting information, the projector 40 projects a projection image Ga, which is a circular image colored in blue and having the person in charge number "1", on a package going to Tokyo that is first conveyed by the conveyance conveyor. The projector 40 projects the projection images Ga, which is a circular image colored in green and having the person in charge number "2", on a package going to Osaka that is second conveyed by the conveyance conveyor. Further, the projector 40 projects the projection image Ga, which is a circular image colored in blue and having the person in charge number "2", on a package going to Tokyo that is third conveyed by the conveyance conveyor. This makes the person in charge M2 having the person in charge number "2", who normally sorts the packages going to Osaka, to sort both the packages going to Tokyo and the packages going to Osaka. Here, the projection image Ga, which is the circular image colored in blue and having the person in charge number "2", is projected as a help screen for the person in charge of sorting the package going to Osaka to help sort the package going Tokyo, but the projection image Ga may be a projection image that blinks in blue instead of colored in blue. The projector 40 projects the projection image Ga, which is a circular image colored in yellow and having the person in charge number "3", on a package going to Hokkaido that is fourth conveyed by the conveyance conveyor.

The processor 210 of the server 200 instructs the truck transport management device 300 to arrange trucks via the network NW2 according to the package identification information including the changed sorting information (T6). When the instruction is received, the truck transport management device 300 displays truck arrangement information on the display unit 312 and instructs truck delivery.

The processor 210 of the server 200 outputs the changed sorting information to the warehouse control device 400 via the network NW3 (T7). The warehouse control device 400 displays the changed sorting information on the display unit 412.

As described above, in the projection instruction system 5, when the projection image including the sorting information is projected on the upper surface of the package, the person in charge of sorting is represented by the number superimposed on the projected circular image, and the sorting destination is represented by the color of the circular image. This enables the worker in charge of sorting to easily recognize the person in charge of the package to be sorted and the delivery destination. When a sorting amount of packages to a sorting destination of specific packages is large, the projection instruction device can assign a worker who sorts packages to another sorting destination to sort the specific packages and instruct the worker to support a worker who sorts the specific packages. Therefore, the projection instruction device can uniformize work of workers in charge of sorting. In addition, a delay in sorting of packages to a specific sorting destination is prevented.

Figure 7:
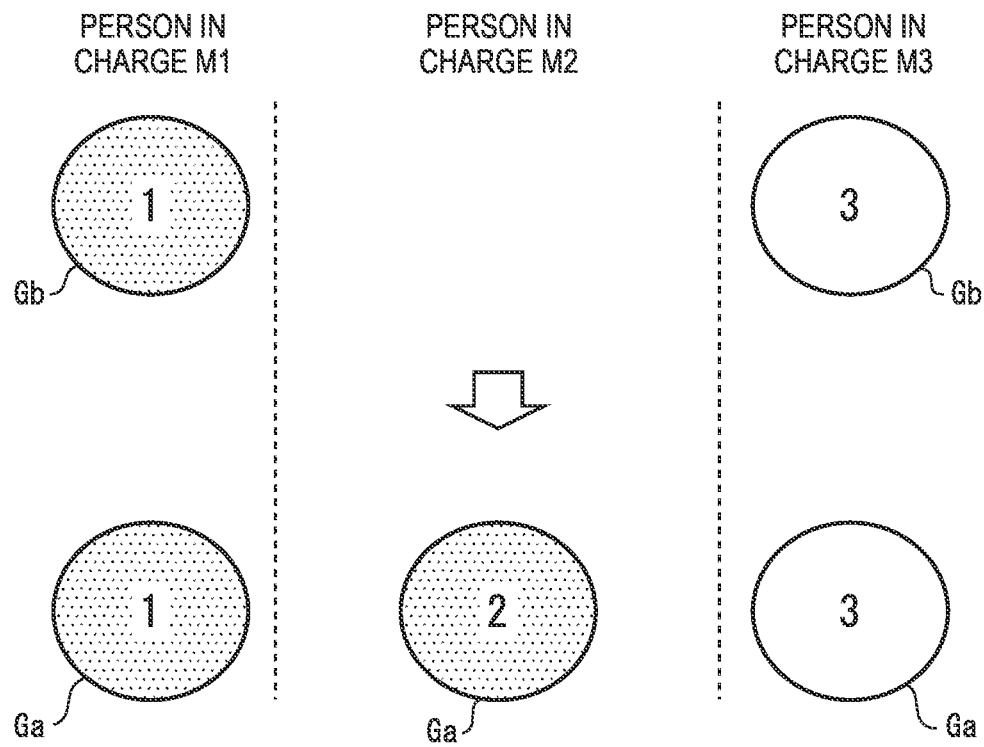
FIG. 7 is a view showing another example of a projection pattern projected on an upper surface of a package.

FIG. 7 is a view showing another example of a projection pattern projected on an upper surface of a package. When a large number of packages going to Tokyo are to be sorted, the processor 210 of the server 200 may assign a free person in charge M2 to the package sorting system 100 so as to temporarily sort packages going to Tokyo. In this case, the projection instruction device 30 instructs the projector 40 to project a circular image colored in blue and having the person in charge number "2" on an upper surface of a package. Accordingly, the number of persons in charge of sorting packages going to Tokyo is increased by one, and work of sorting the packages going to Tokyo is promoted.

Figure 8:
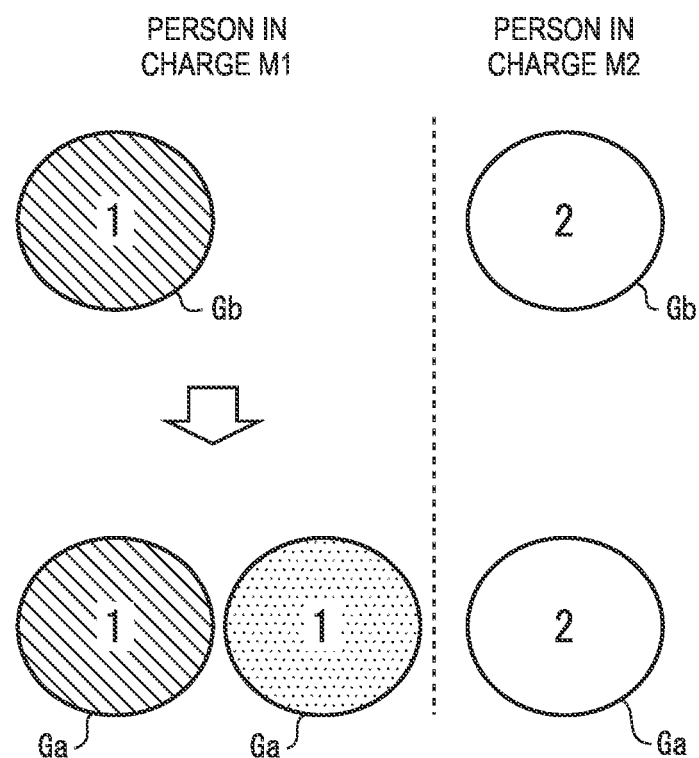
FIG. 8 is a view showing still another example of a projection pattern projected on an upper surface of a package.

FIG. 8 is a view showing still another example of a projection pattern projected on an upper surface of a package. In a status in which there are the person in charge M1 who sorts packages going to Osaka and the person in charge M2 who sorts packages going to Hokkaido, when the packages going to Tokyo are sorted, the processor 210 of the server 200 may assign the packages going to Tokyo to the person in charge M1 who sorts the packages going to Osaka if the number of packages going to Osaka is small. In this case, the projection instruction device 30 instructs the projector 40 to project a circular image colored in green and having the person in charge number "1" on an upper surface of a package going to Osaka, and project a circular image colored in blue and having the person in charge number "1" on an upper surface of a package going to Tokyo. This enables one person in charge to sort both the packages going to Osaka and the packages going to Tokyo.

(Urgent Package Sorting)

Figure 9:
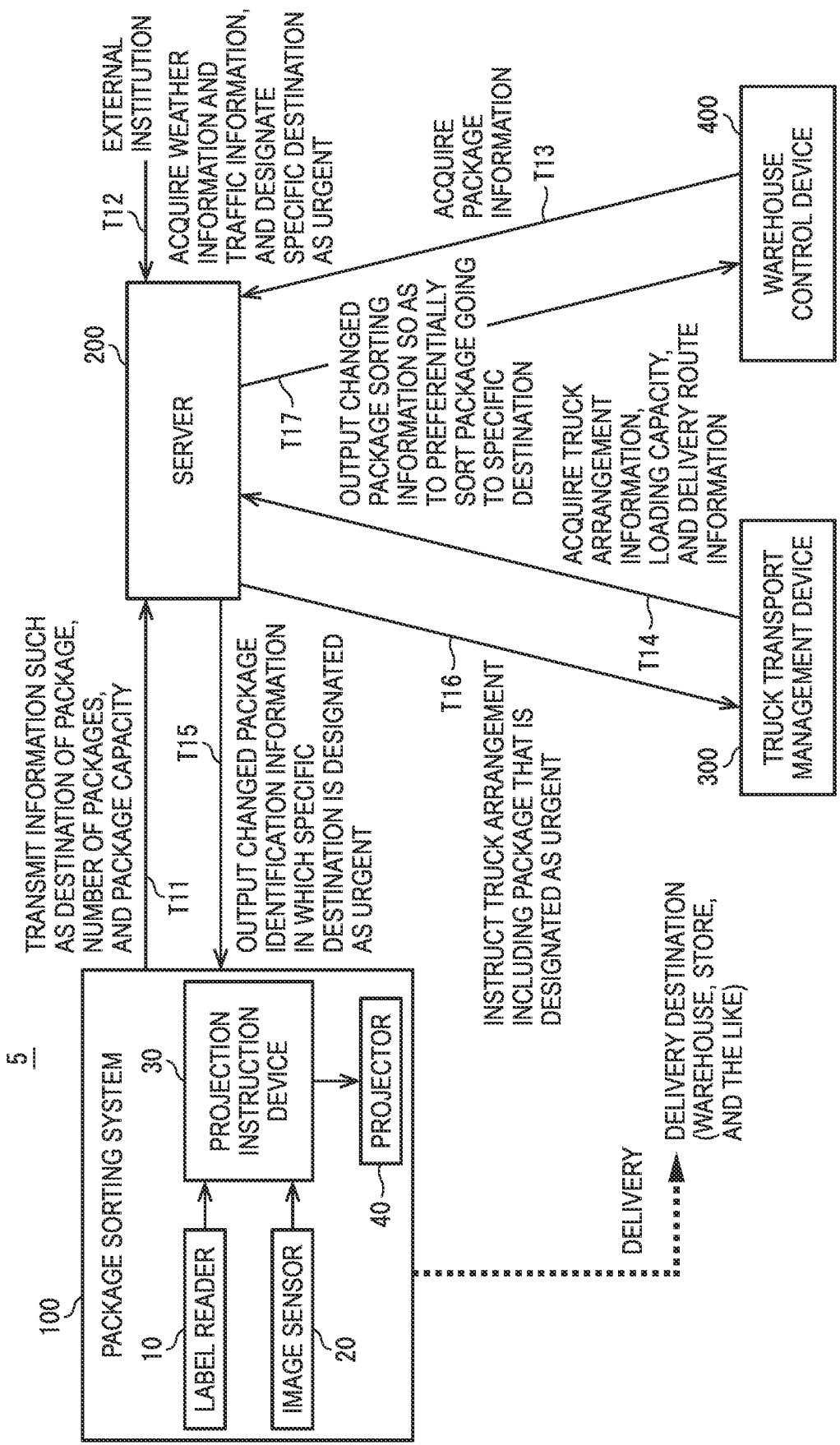
FIG. 9 is a diagram showing a procedure of an operation of sorting urgent packages in the projection instruction system.

FIG. 9 is a diagram showing a procedure of an operation of sorting urgent packages in the projection instruction system 5. The projection instruction device 30 of the package sorting system 100 reads a label attached to a package conveyed by conveyance conveyor by the label reader 10, and acquires a package amount, a loading rate, and package handling information for each destination (T11). The projection instruction device 30 transmits the acquired information to the server 200 connected to the network NW1 by the communication circuit 39.

The processor 210 of the server 200 periodically acquires weather information and traffic information from the external institution as external information. For example, when a typhoon is predicted to come to Hokkaido in the weather information, a status occurs in which packages going to Hokkaido is desired to be quickly sorted. The processor 210 designates a package going to a specific destination (here, Hokkaido) as urgent (T12). Examples of a case of urgent designation include a case where an event is held in vicinity of a delivery route and traffic jam is predicted, in addition to a case where the typhoon is approaching according to the weather information.

The processor 210 of the server 200 acquires package information from the warehouse control device 400 via the network NW3 (T13). For example, the processor 210 acquires a sorting amount, the number of current or daily packages, and worker information as the package information. The worker information includes the number of workers and proficiency thereof.

The processor 210 of the server 200 acquires truck arrangement information, a loading capacity of a scheduled truck, and delivery route information from the truck transport management device 300 via the network NW2 (T14).

The processor 210 of the server 200 instructs the package sorting system 100 to perform urgent designation on the package going to Hokkaido as the changed sorting information based on information on urgent designation in the procedure T12 (T15).

When the projection instruction device 30 of the package sorting system 100 receives the instruction via the communication circuit 39, the projection instruction device 30 instructs the projector 40 to perform urgent designation on the package going to Hokkaido and project a projection image such that the person in charge M1 sorts the packages going to Tokyo, the person in charge M2 sorts the packages going to Osaka, and the person in charge M3 sorts the packages going to Hokkaido, as the changed sorting information.

Figure 10:
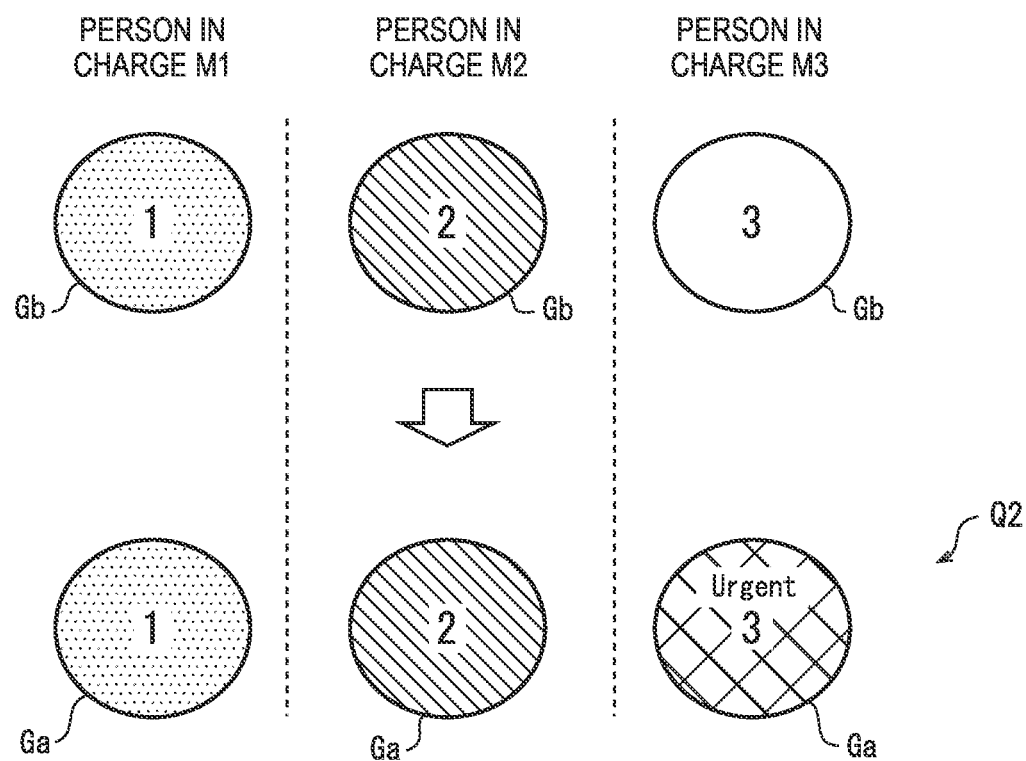
FIG. 10 is a view showing a projection pattern projected on an upper surface of an urgent package.

FIG. 10 is a view showing a projection pattern Q2 projected on an upper surface of an urgent package. In the projection pattern Q2, the projector 40 projects the projection image Ga, which is a circular image colored in blue and having the person in charge number "1", on a package going to Tokyo that is first conveyed by the conveyance conveyor. The projector 40 projects the projection images Ga, which is a circular image colored in green and having the person in charge number "2", on a package going to Osaka that is second conveyed by the conveyance conveyor. In a normal case, the projector 40 projects the projection image Gb, which is a circular image colored in yellow and having the person in charge number "3", on a package going to Hokkaido that is third conveyed by the conveyance conveyor. However, in the case of urgent designation, the projector 40 projects the projection image Ga, which is a circular image colored in red (indicated by crosses in the drawing) and having a word "Urgent" and the person in charge number "3". The person in charge M3 who sorts packages going to Hokkaido can quickly cope with urgent sorting by visually recognizing the projection image Ga, which is an unusually conspicuous circular image colored in red and having the word "Urgent", projected on an upper surface of a package.

The processor 210 of the server 200 instructs the truck transport management device 300 to arrange trucks via the network NW2 according to the changed sorting information including information of the package that is designated as urgent (T16). When the instruction is received, the truck transport management device 300 displays truck arrangement information on the display unit 312 and instructs truck delivery.

The processor 210 of the server 200 outputs the changed sorting information, which is changed to preferentially sort packages going to Hokkaido, to the warehouse control device 400 via the network NW3 (T17). The warehouse control device 400 displays the changed sorting information on the display unit 412.

As described above, in the projection instruction system 5, the projection instruction device can instruct to prioritize a task for a sorting destination that needs to be urgent.

(Package Sorting in Consideration of Truck Arrangement)

Figure 11:
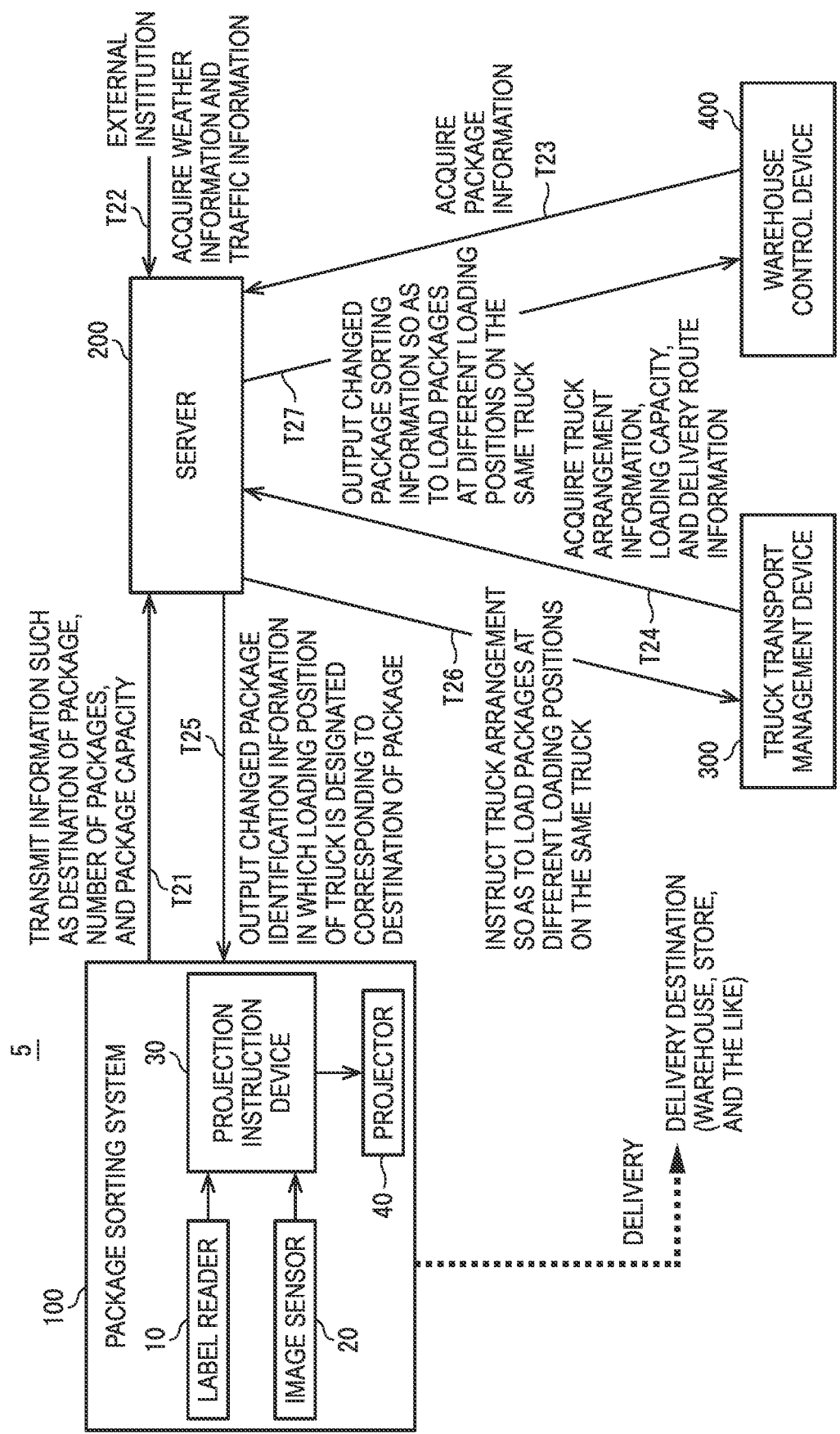
FIG. 11 is a diagram showing a procedure of a package sorting operation in consideration of truck arrangement in the projection instruction system.

FIG. 11 is a diagram showing a procedure of a package sorting operation in consideration of truck arrangement in the projection instruction system 5. The projection instruction device 30 of the package sorting system 100 reads a label attached to a package conveyed by the conveyance conveyor by the label reader 10, and acquires a package amount, a loading rate, and package handling information for each destination (T21). The projection instruction device 30 transmits the acquired information to the server 200 connected to the network NW1 by the communication circuit 39.

The processor 210 of the server 200 periodically acquires weather information and traffic information from the external institution as external information (T22).

The processor 210 of the server 200 acquires package information from the warehouse control device 400 via the network NW3 (T23). For example, the processor 210 acquires a sorting amount, the number of current or daily packages, and worker information as the package information. The worker information includes the number of workers and proficiency thereof.

The processor 210 of the server 200 acquires truck arrangement information, a loading capacity of a scheduled truck, and delivery route information from the truck transport management device 300 via the network NW2 (T24).

The processor 210 of the server 200 instructs the package sorting system 100 to designate a loading position to a loading bed of a truck corresponding to a destination of a package as package identification information including the changed sorting information based on the truck arrangement information, the loading capacity of the scheduled truck, and the delivery route information acquired in the procedure T24 (T25). For example, when a delivery route of the truck is a departure point: Osaka, a stopover point: Yokohama, and an arrival point: Tokyo, the processor 210 designates a loading position of a package going to Tokyo in the back of the loading bed of the truck, and designates a loading position of a package going to Yokohama in the front thereof.

When the projection instruction device 30 of the package sorting system 100 receives the instruction via the communication circuit 39, the projection instruction device 30 instructs the projector 40 to project, as the changed sorting information, a projection image that is a circular image in which the loading position of the package going to Yokohama is designated in the front and a projection image that is a circular image in which the loading position of the package going to Tokyo is designated in the back.

Figure 12:
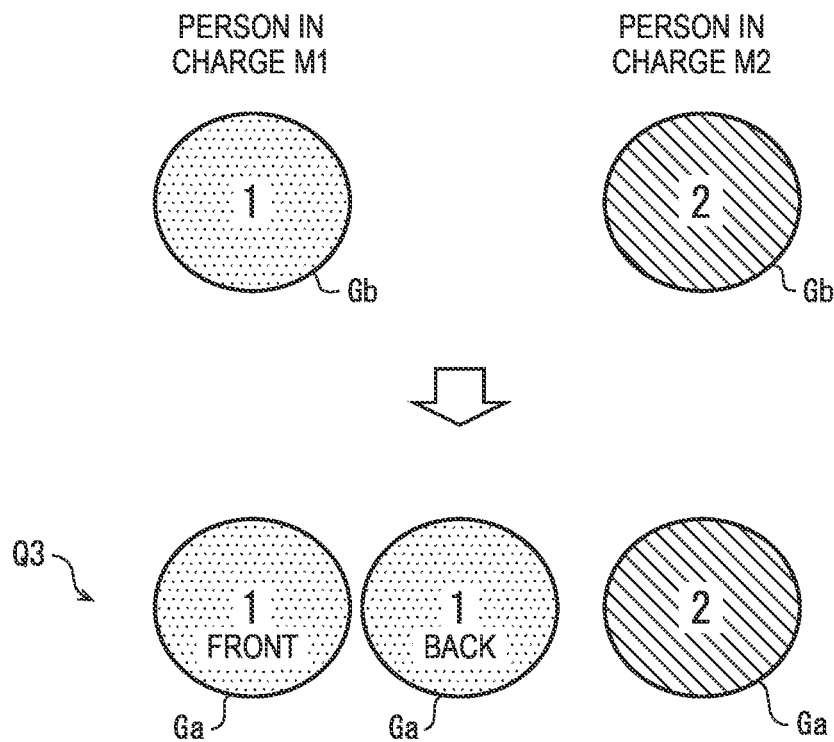
FIG. 12 is a view showing a projection pattern projected on an upper surface of a package whose loading position is designated.

FIG. 12 is a view showing a projection pattern Q3 projected on an upper surface of a package whose loading position is designated. In the projection pattern Q3, the projector 40 projects a projection image, which is a circular image colored in blue and having a word "Front" and the person in charge number "1", on a package going to Yokohama that is first conveyed by the conveyance conveyor. The word "Front" indicates that a loading position of the package is in the front of a package bed. In addition, the projector 40 projects a projection image, which is a circular image colored in blue and having a word "Back" and the person in charge number "1", on a package going to Tokyo that is second conveyed by the conveyance conveyor. The projector 40 projects a projection image, which is a circular image colored in green and having the person in charge number "2", on a package going to Osaka that is third conveyed by the conveyance conveyor. Here, the loading position of the package to the loading bed of the truck is represented by simple words of "Front" and "Back", but may be represented by an illustration (an illustration representing a front side, an illustration representing a back side), a color, a font, or the like.

The processor 210 of the server 200 instructs the truck transport management device 300 to arrange trucks so as to load packages at different loading positions on the same truck via the network NW2 according to the changed sorting information including information of the package whose loading position is designated (T26). When the instruction is received, the truck transport management device 300 displays truck arrangement information on the display unit 312 and instructs truck delivery.

The processor 210 of the server 200 outputs the changed sorting information to the warehouse control device 400 via the network NW3 so as to load the packages at different loading positions on the same truck (T27). The warehouse control device 400 displays the changed sorting information on the display unit 412.

As described above, in the package sorting system 100, for example, a case is assumed where packages are loaded on a truck going to Tokyo whose departure point is Osaka, stopover point is Yokohama, and arrival point is Tokyo. The projection instruction device instructs to project, on an upper surface of a package going to Yokohama, a projection image having a word "Front" that prompts the package to be placed in the front of a loading bed of the truck. In addition, the projection instruction device instructs to project, on an upper surface of a package, a projection image having a word "Back" that prompts the package to be placed in the back of the loading bed of the truck. A worker who sorts packages loads the package on which the projection image having the word "Front" is projected in the front of the loading bed of the truck. In addition, the worker loads the package on which the projection image having the word "Back" is projected in the back of the loading bed of the truck. Accordingly, in a case where a departure point, a stopover point, and an arrival point are set as a delivery route, work efficiency of loading and unloading is improved when a driver who delivers by the truck unloads the package at each point.

(Package Sorting in Consideration of Package Handling Information)

In the projection instruction system 5, the label reader 10 of the package sorting system 100 reads a label attached to a package, and transmits a package amount, a loading rate, and package handling information for each destination read by the projection instruction device 30 to the server 200. The processor 210 of the server 200 changes package identification information including sorting information in consideration of package handling based on the package handling information acquired from the package sorting system 100. The processor 210 transmits the package identification information including the changed sorting information to the projection instruction device 30. The projection instruction device 30 instructs the projector 40 to project a projection image in consideration of the package handling information on the package based on the changed sorting information.

The processor 210 of the server 200 may acquire the package handling information from the warehouse control device 400, the truck transport management device 300, or the like.

Figure 13:
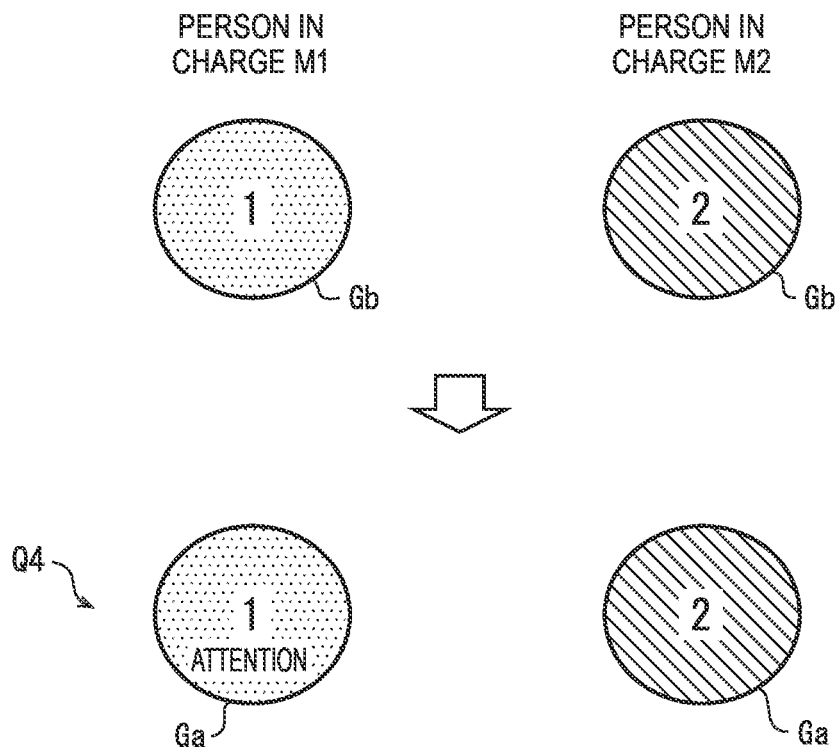
FIG. 13 is a view showing a projection pattern projected on an upper surface of a package in consideration of package handling information.

FIG. 13 is a view showing a projection pattern Q4 projected on an upper surface of a package in consideration of package handling information. In the projection pattern Q4, the projector 40 projects the projection image Ga, which is a circular image colored in blue and having a word "Attention" and the person in charge number "1", on a package going to Tokyo that is first conveyed by the conveyance conveyor. The word "Attention" indicates that attention is required for package sorting. The projector 40, as usual, projects the projection image Ga, which is a circular image colored in green and having the person in charge number "2", on a package going to Osaka that is second conveyed by the conveyance conveyor. Here, the word "Attention" is projected as a part of the circular image, but other words such as "Handle carefully" and "Fragile item", and an illustration or a symbol calling attention may be projected as package handling information. The package handling information may be expressed by blinking the circular image.

As described above, in the projection instruction system, the projection instruction device can call attention to a package that needs to be particularly carefully sorted, such as a package of a very important person (VIP) or a package in which a fragile item is packaged.

(Sorting of Packages When Loading on Next Truck) In the projection instruction system 5, the processor 210 of the server 200 changes sorting information based on a loading capacity of a truck and truck arrangement information received from the truck transport management device 300 such that a package to be delivered is loaded on a loading bed of a next truck. The processor 210 transmits package identification information including the changed sorting information to the projection instruction device 30. The projection instruction device 30 instructs the projector 40 to project, on the package, a projection image instructed to be loaded on the next truck based on the package identification information including the changed sorting information.

Figure 14:
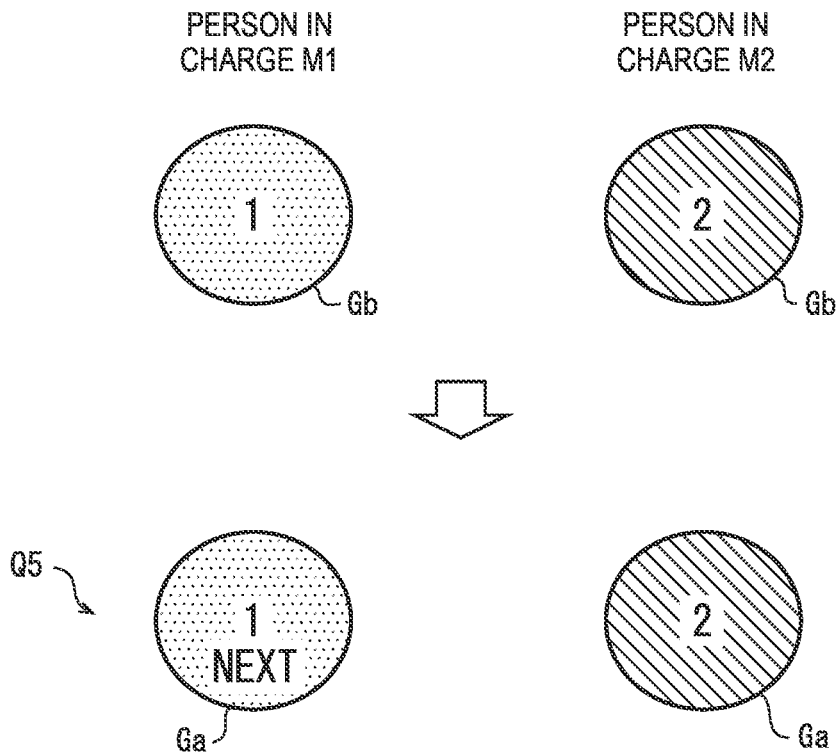
FIG. 14 is a view showing a projection pattern projected on an upper surface of a package when the package is loaded on a next truck.

FIG. 14 is a view showing a projection pattern Q5 projected on an upper surface of a package when the package is loaded on a next truck. In the projection pattern Q5, the projector 40 projects the projection image Ga, which is a circular image colored in blue and having a word "NEXT" and the person in charge number "1", on a package going to Tokyo conveyed by the conveyance conveyor. The word "NEXT" indicates a current truck is full and the package is prompted to be loaded on the next truck.

The projector 40 projects the projection image Ga, which is a circular image colored in green and having the person in charge number "2" as usual, on a package going to Osaka that is second conveyed by the conveyance conveyor. Here, the word "NEXT" is projected as a part of the circular image, but other words such as "Next truck from here" or "Truck change", or an illustration or a symbol representing next truck information may be projected as the next truck information. The next truck information may be expressed by blinking the circular image. In this case, by making a blinking pattern of the circular image different from a blinking pattern of the package handling information, the worker in charge of sorting can easily recognize the next truck information.

As described above, in the package sorting system 100, the projection instruction device can instruct the worker in real time to load the package to be sorted to the next truck when the currently loaded truck is full. Therefore, the worker can sort the package by easily recognizing that the package is to be loaded on the next truck. This improves efficiency of the sorting work.

(Projection to Gap Between Packages Conveyed by Conveyance Conveyor)

The package sorting system 100 can also provide information by projecting a projection image to a gap between packages conveyed by the conveyance conveyor. The processor 210 of the server 200 transmits information such as a stop of the conveyance conveyor and a message to the worker to the projection instruction device 30. The projection instruction device 30 instructs the projector 40 to project the projection image including the information (provided information). The projector 40 projects the projection image including the provided information to the gap between the packages so as not to cover the packages. A projection position or a projection timing is determined by the projection instruction device 30 instructing the projector 40. The projector 40 may project the projection image at a predetermined projection position or at a predetermined timing.

Here, when the provided information is information indicating the stop of the conveyance conveyor, the package sorting system 100 can alert the worker that the conveyance convey will stop soon before the conveyance conveyor stops. When the provided information is the message to the worker, examples of the message to the worker include notifying the worker of a sorting score (worker score) and a sorting level. Examples of the message for encouraging the worker include messages such as "Hello", "Thank you", "Good morning", "Well done", "Excellent", and "Thanks". As mental preparation, notification of going to be busy may include a message such as "The amount of package going to Tokyo will increase for about ten minutes in three minutes", "You will be busy in a few minutes", or the like.

Figure 15:
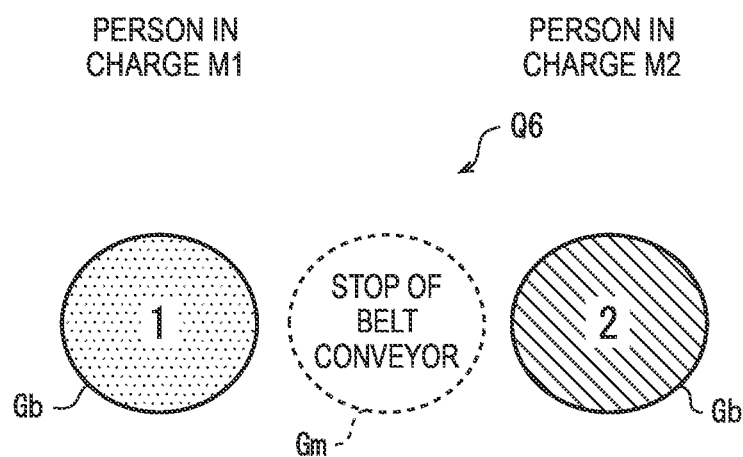
FIG. 15 is a view showing a projection pattern in which a projection image including provided information is projected in a gap between packages conveyed by a conveyance conveyor separately from a projection image that is a circular image.

FIG. 15 is a view showing a projection pattern Q6 in which a projection image Gm including provided information is projected in a gap between packages conveyed by the conveyance conveyor separately from the projection image Ga that is a circular image. In the projection pattern Q6, the projector 40 projects the projection image Gm including a message of "Stop of belt conveyor" as an alert to the gap between a package going to Tokyo conveyed by the conveyance conveyor and a package going to Osaka conveyed next by the conveyance conveyor.

However, the projection image Gm including words for providing information is projected in the gap between the packages, but the projection image Gm may be projected on a surface of the conveyance conveyor, a periphery of the conveyance conveyor, or the like where the package is not placed. The projection image Gm is not limited to words, and may be an illustration, a symbol, or the like representing provided information.

As described above, in the projection instruction system 5, the projection instruction device can project, separately from the projection image Ga including the package sorting information, the projection image Gm including a message such as "Keep it up" or "One hour left before finishing" that does not directly relate to the package sorting and can increase the motivation of the worker.

In a projection pattern in which the projection image Gm is projected to the gap between the packages, the projection image Gm may be projected to a region that does not cover the packages, such as a gap between a front side of a package and a rear side of a package that are designated as urgent, when the projection image Ga colored in red and having the word "Urgent" is projected on a package that is designated as urgent. In this case, information such as a reason for urgent designation can be included in the projection image Gm.

As described above, in the projection instruction system 5 according to the first embodiment, the projection instruction device 30 instructs projector 40 (an example of an image projection device) to project a projection image on a package. The projection instruction device 30 includes the processor 34, the memory 36 that stores package identification information for identifying each of a plurality of packages to be delivered, and the communication circuit 39 that communicates with the server 200. The processor 34 cooperates with the memory 36 to generate the projection image Gb (an example of a first projection image) indicating sorting of the corresponding package based on the package identification information for each package stored in the memory 36, and instructs the projector 40 to project the projection image Gb. When an external instruction including a change in the package identification information is received from the server 200, the processor 34 generates the projection image Ga (an example of a second projection image) indicating sorting of the corresponding package based on the changed package identification information, and instructs the projector 40 to project the projection image Ga.

Accordingly, even when there is an external instruction such as an addition, a change, or a deletion of information on the package to be sorted, the projection instruction device 30 can adaptively support efficiency improvement of package sorting work and delivery, and contribute to efficiency improvement of package distribution.

The server 200 acquires package information from the warehouse control device 400. The package information includes, for example, a sorting amount, the number of current or daily packages (an example of a sorting number), and worker information. The processor 34 generates an image indicating help for sorting to a specific sorting destination as a part of the projection image Ga when it is determined that a sorting amount of packages to the specific sorting destination exceeds a sorting upper limit value of one worker based on the package identification information including the changed sorting information transmitted from the server 200 that has acquired the information on the sorting amount and a sorting number of workers. For example, the processor 34 generates the projection image Ga, which is a circular image colored in blue and having the person in charge number "2" representing a person in charge who sorts packages going to Osaka, on a package going to Tokyo that is conveyed by the conveyance conveyor. Accordingly, when a sorting amount of packages to a sorting destination of specific packages is large, the projection instruction device 30 can assign a worker who sorts packages to another sorting destination to sort the specific packages and instruct the worker to support a worker who sorts the specific packages. Therefore, the projection instruction device 30 can uniformize work of workers in charge of sorting. In addition, a delay in sorting of packages to a specific sorting destination is prevented.

The server 200 acquires weather information (an example of weather forecast information) or traffic information from the external institution. When it is determined that a delivery time point of the package to the specific sorting destination is earlier than an originally scheduled time point based on the package identification information including the changed sorting information transmitted from the server 200 that has acquired the weather information or the traffic information, the processor 34 generates an image indicating that the package to be sorted to the specific sorting destination is to be delivered urgently as a part of the projection image Ga. For example, in a case of emergency designation, the processor 34 generates the projection image Ga that is a circular image colored in red and having a word "Urgent" and the person in charge number "3". This enables the projection instruction device 30 to instruct to prioritize a task for a sorting destination that needs to be urgent.

The server 200 acquires information indicating that attention is required for handling of a specific package. When it is determined that attention is required for the handling of the specific package based on the package identification information including the changed sorting information transmitted from the server 200 that has acquired the information indicating that attention is required for the handling of the specific package, the processor 34 generates an image indicating that attention is required for sorting of the specific package as a part of the projection image Ga. For example, the processor 34 generates the projection image Ga, which is a circular image colored in blue and having a word "Attention" and the person in charge number "1", on a package going to Tokyo. Accordingly, the projection instruction device 30 can call attention to a package that needs to be particularly carefully sorted, such as a package of a very important person or a package in which a fragile object is packaged.

The server 200 acquires information on a current loading amount of packages on a specific truck (an example of a delivery vehicle). When it is determined that loading onto the truck is impossible based on the changed sorting information transmitted from the server 200 that has acquired information on the current loading amount of the packages on the truck, the processor 34 generates an image indicating that the next and subsequent packages following the package sorted immediately before are to be sorted to another truck as a part of the projection image Ga. For example, the processor 34 generates the projection image Ga, which is a circular image colored in blue and having a word "NEXT" and the person in charge number "1", on a package going to Tokyo. This enables the projection instruction device 30 to instruct the worker in real time that the truck on which loading is currently performed is fully loaded and packages to be sorted are to be loaded on the next truck. Therefore, the worker can sort the package by recognizing in advance that the package is to be loaded on the next truck. The efficiency of the sorting work is improved.

The projection instruction device 30 is further connected to the label reader 10 that reads package identification information from a label attached to a package. The processor 34 stores package sorting information input from the label reader 10 in the memory 36. Accordingly, since the label reader 10 acquires the package identification information from the label attached to the package, when the package identification information is changed, the projection instruction device 30 can acquire the changed package identification information from the label attached after the change. In this case, the server 200 may not generate a projection image including the changed sorting information. The projection instruction device 30 can instruct the projector 40 to project a projection image including the sorting information on an upper surface of the package without the server 200. Therefore, a configuration of the package sorting system 100 is simplified.

The processor 34 of the server 200 generates the projection image Gm (third projection image) including provided information. The projection instruction device 30 instructs the projector 40 to project the projection image Gm to a gap between a plurality of packages to be sequentially delivered. This enables the projection instruction device 30 to project the projection image Gm including a message of "Stop of conveyance conveyor" as an alert to the worker, and to project the projection image Gm including a message of "Keep it up", "One hour left before finishing", or the like for increasing motivation of the worker.

The server 200 acquires information on a delivery destination of the package. When it is determined a loading position of the package on a truck based on the changed sorting information transmitted from the server 200 that has acquired the information on the delivery destination of the package, the processor 34 generates an image indicating the loading position of the package as a part of the projection image Ga. For example, the processor 34 generates the projection image Ga having a word "Front" on an upper surface of a package going to Yokohama to prompt the package to be placed in the front of a loading bed of the truck. In addition, the processor 34 generates the projection image Ga including a word "Back" that prompts a package to be placed in the back of the loading bed of the truck.

Accordingly, in a case where a departure point, a stopover point, and an arrival point are set as a delivery route, work efficiency of loading and unloading is improved when a driver who delivers by the truck unloads the package locally.

In the projection instruction system 5, the projection instruction device 30 that instructs the projector 40 to project a projection image onto a package and the server 200 are communicably connected to each other. The projection instruction device 30 includes the memory 36 that stores package identification information for identifying each of a plurality of packages to be delivered. The projection instruction device 30 generates the projection image Gb (an example of the first projection image) indicating sorting of the corresponding package based on the package identification information including sorting information for each package stored in the memory 36, and instructs the projector 40 to project the projection image Gb. The server 200 transmits an external instruction including a change in the package identification information to the projector 40. When the external instruction is received from the server 200, the projector 40 generates the projection image Ga (an example of the second projection image) indicating sorting of the corresponding package based on the package identification information including the changed sorting information, and instructs the projector 40 to project the projection image Ga. Accordingly, even when there is an external instruction such as an addition, a change, or a deletion of information on the package to be sorted, the projection instruction device 30 can adaptively support efficiency improvement of package sorting work and delivery, and contribute to efficiency improvement of package distribution.

Each time loading of the package on which the projection image Ga is projected onto a truck is detected, the projection instruction device 30 transmits package identification information including capacity information on the loaded (corresponding) package to the server 200. The processor 210 of the server 200 calculates a current occupied capacity of each of a plurality of trucks to different delivery destinations based on the package identification information transmitted from the projection instruction device 30. The processor 210 of the server 200 generates the UI screen 350 indicating a calculation result of the current occupied capacity of each of the plurality of trucks, and displays the UI screen 350 on the display unit 312 of the truck transport management device 300 and the display unit 412 of the warehouse control device 400 (an example of a display device). This enables a delivery manager of the trucks or each worker in charge of sorting to each delivery destination to easily grasp a loading status of the packages onto the truck, for example, how many packages are to be loaded on the current truck and from which package the packages are to be loaded on the next truck.

[Second Utilization Example of Projection Instruction System]

The server 200 acquires a package capacity and sorting progress information of packages as information on the sorted packages from the package sorting system 100, and formulates and changes a truck delivery plan and a personnel arrangement plan. In a second utilization example, the server 200 and the package sorting system 100 construct a plan data management system that manages the truck delivery plan and the personnel arrangement plan.

First, the package capacity can be measured using the image sensor 20 included in the package sorting system 100. The image sensor 20 can use a 3D sensor as the distance image sensor 22, and the 3D sensor measures a distance by performing matching between images of two cameras.

The server 200 updates the truck delivery plan (for example, a plan related to truck arrangement) in real time based on the package capacity of packages acquired from the package sorting system 100. The server 200 outputs the updated truck delivery plan to the truck transport management device 300 and the warehouse control device 400.

The truck transport management device 300 arranges trucks using the truck delivery plan updated in real time. For example, when the truck transport management device 300 is scheduled to have two trucks going to Tokyo in a warehouse, but packages have a size smaller than expected, the truck transport management device 300 can change the two trucks going to Tokyo to one truck (cancel one truck). And, one truck going to Osaka can be suddenly added when just one truck going to Osaka was scheduled and packages have a size larger than expected. This enables the truck transport management device to efficiently arrange the trucks and reduce a truck operation cost.

The server 200 updates the truck delivery plan (for example, a plan related to a delivery fee) in real time based on package capacity information acquired from the package sorting system 100. The server 200 outputs the updated truck delivery plan to the truck transport management device 300.

For example, the server 200 may predict sorting in the future (the next day or the like) and dynamically change a fee for today reception and a fee for the next day. This enables the truck transport management device 300 to solve inconvenience that a fee is constant regardless of the number of packages, that is, regardless of the number of trucks. As described above, it is possible to realize dynamic pricing in which the required number of trucks is determined based on a package capacity of packages to be sorted. Therefore, the truck transport management device can set a delivery fee of packages going to Tokyo at a low price on a day when the number of trucks going to Tokyo is small. The truck transport management device may dynamically predict a future (the next day or the like) fee, or may determine a delivery fee later based on an amount of packages on that day.

Next, the sorting progress information can be measured by the package sorting system 100 using the image sensor 20. The color image sensor 24 can be used as the image sensor 20. The color image sensor captures an image of a package conveyed by the conveyance conveyor and detects a color of a projection image projected on an upper surface of the package. The package sorting system 100 acquires the sorting progress information based on projection images in different colors for respective sorting destinations.

The server 200 updates the personnel arrangement plan in real time based on the sorting progress information acquired from the package sorting system 100. The server 200 outputs the updated personnel arrangement plan to the warehouse control device 400.

For example, the server 200 changes the personnel arrangement plan in real time based on the sorting progress information of the packages acquired from the package sorting system 100, and outputs information of the changed personnel arrangement plan to the warehouse control device 400. The warehouse control device 400 arranges workers according to the personnel arrangement plan. For example, sorting work is inefficient in a case where a person in charge of packages going to Tokyo needs to sort by one person even on a day or in a time period when the number of packages going to Tokyo is abnormally large. In such a case, the warehouse control device 400 can support the person in charge of the packages going to Tokyo by temporarily arranging a highly proficient person in charge in sorting of the packages going to Tokyo on the day or in the time period when the number of packages going to Tokyo is abnormally large. This improves efficiency of the sorting work.

As described above, the projection instruction system 5 according to the first embodiment is applied to the plan data management system in which the projection instruction device 30 (an example of a sensor device) to which the image sensor 20 is connected and the server 200 are communicably connected to each other. The projection instruction device 30 detects information on packages (package capacity information, sorting progress information) corresponding to each of a plurality of packages conveyed on the conveyance conveyor 50 (an example of a conveyance device), and transmits the information to the server 200. The server 200 includes the memory 211 that stores plan data (for example, the truck delivery plan and the personnel arrangement plan) related to delivery of each of the plurality of packages. The server 200 updates the plan data stored in the memory 211 based on the information on the packages transmitted from the projection instruction device 30. The server 200 outputs the updated plan data to external control devices (for example, the truck transport management device 300 and the warehouse control device 400) connected to the server 200.

This enables the server 200 to formulate or update the truck delivery plan using the information on the packages acquired from the projection instruction device 30, for example, a package capacity of the packages. The server 200 can formulate or update the personnel arrangement plan using the sorting progress information acquired from the projection instruction device 30.

The projection instruction device 30 detects capacity information on the (corresponding) package to be delivered as the information on the packages by using the distance image sensor 22 included in the image sensor 20. The server 200 updates the truck delivery plan (an example of arrangement plan data of a delivery truck that delivers packages) as the plan data based on the capacity information on each of the plurality of packages. This enables the server 200 to receive the package capacity information from the projection instruction device 30 and output the changed information of the truck delivery plan to the truck transport management device 300 in real time. The truck transport management device 300 can arrange trucks according to the truck delivery plan. Therefore, the truck transport management device 300 can efficiently arrange the trucks and reduce a truck operation cost. The server 200 can receive the package capacity information from the projection instruction device 30, change the truck delivery plan in real time, and change a delivery fee.

The projection instruction device 30 acquires the sorting progress information of the (corresponding) packages loaded on the truck as the information on the packages by using the color image sensor 24 included in the image sensor 20. The server 200 updates the personnel arrangement plan (an example of arrangement plan data of the workers who sort the packages) as the plan data based on the sorting progress information of each of the plurality of packages. Accordingly, the server 200 receives the sorting progress information of the packages from the projection instruction device 30 and outputs the changed information of the personnel arrangement plan to the warehouse control device in real time. The warehouse control device arranges the workers according to the personnel arrangement plan. For example, the warehouse control device can support a person in charge of the packages going to Tokyo by changing arrangement of a highly proficient person in charge to sorting packages going to Tokyo during a period when the number of packages going to Tokyo is abnormally large.

Although various embodiments have been described above with reference to the drawings, it is needless to say that the present disclosure is not limited to such examples. It will be apparent to those skilled in the art that various changes, modifications, substitutions, additions, deletions, and equivalents can be conceived within the scope of the claims, and it should be understood that such changes and the like also belong to the technical scope of the present disclosure. Components in the various embodiments described above may be combined freely in a range without deviating from the spirit of the invention.

For example, in the first embodiment described above, the projection image projected on the upper surface of the package by the projector 40 is the circular image, but may be a polygonal image such as a rectangle or a triangle. The projection image is not limited to a still image, and may be an animation. Examples of the animation include blinking, enlarging or reducing the projection image, and changing a color of the projection image. The projector may project the projection image on a surface (a front surface, a back surface, a side surface, or the like) of the package so that the worker can easily sort without being limited to the upper surface of the package.

The present application is based on a Japanese patent application (Japanese Patent Application No. 2019-160643) filed on Sep. 3, 2019, the contents of which are incorporated herein by reference.

INDUSTRIAL APPLICABILITY

The present disclosure is useful because, even when there is an external instruction such as an addition, a change, or a deletion of information on a package to be sorted while sorting the package, efficiency of package sorting work and delivery can be adaptively supported, and efficiency of package distribution can be improved.

REFERENCE SIGNS LIST 5 projection instruction system
10 label reader
20 image sensor
22 distance image sensor
24 color image sensor
30 projection instruction device
32 input unit
34 processor
36 memory
38 output unit
39 communication circuit
40 projector
100 package sorting system
200 server
210 processor
211 memory
212 display unit
213 output unit
214 reception unit
300 truck transport management device
400 warehouse control device
NW1, NW2, NW3 network

The invention claimed is:
1. A projection instruction device that instructs an image projection device to project a projection image onto a package, the projection instruction device comprising:

a processor;

a memory that stores package identification information for identifying each of a plurality of packages to be delivered; and a communication circuit that communicates with a server, wherein the processor cooperates with the memory to generate a first projection image indicating sorting of a corresponding package based on the package identification information for each of the plurality of packages stored in the memory and instruct the image projection device to project the first projection image, and in a case of receiving an instruction including a change in the sorting of the corresponding package from the server, generate a second projection image indicating the sorting of the corresponding package and instruct the image projection device to project the second projection image instead of the first projection image.

2. The projection instruction device according to claim 1, wherein in a case that the server that has acquired information on a sorting amount and a sorting number of workers determines that a sorting amount of packages to a specific sorting destination exceeds a sorting upper limit value of one worker, the processor generates an image indicating help for sorting of the packages to the specific sorting destination as a part of the second projection image.

3. The projection instruction device according to claim 1, wherein in a case that the server that has acquired weather forecast information or traffic information determines that a delivery time point of a package to a specific sorting destination is changed so as to be earlier than an originally scheduled time point, the processor generates an image indicating that the package to be sorted to the specific sorting destination is to be delivered urgently as a part of the second projection image.

4. The projection instruction device according to claim 1, wherein in a case that the server that has acquired information indicating that attention is required for handling of a specific package determines that attention is required for the handling of the specific package, the processor generates an image indicating that attention is required for sorting of the specific package as a part of the second projection image.

5. The projection instruction device according to claim 1, wherein in a case that the server that has acquired information on a current loading amount of packages on a specific delivery vehicle determines that loading onto the specific delivery vehicle is impossible, the processor generates an image indicating that next and subsequent packages following the package sorted immediately before are to be sorted to another delivery vehicle as a part of the second projection image.

6. The projection instruction device according to claim 1, further connected to a label reader that reads the package identification information from a label attached to the package, wherein the processor stores the package identification information input from the label reader in the memory.

7. The projection instruction device according to claim 1, wherein the processor generates a third projection image including information to be presented to the worker, and instructs the image projection device to project the third projection image to a gap between the plurality of packages to be sequentially delivered.

8. The projection instruction device according to claim 1, wherein in a case that the server that has acquired information on a delivery destination of a package determines a loading position of the package on a delivery vehicle, the processor generates an image indicating the loading position of the package as a part of the second projection image.

9. A projection instruction system in which a projection instruction device that instructs an image projection device to project a projection image onto a package and a server are communicably connected to each other, wherein the projection instruction device includes a memory that stores package identification information for identifying each of a plurality of packages to be delivered, and the projection instruction device generates a first projection image indicating sorting of a corresponding package based on the package identification information for each of the plurality of packages stored in the memory and instructs the image projection device to project the first projection image, wherein the server transmits an instruction including a change in the sorting of the corresponding package to the projection instruction device, and wherein in a case of receiving the instruction from the server, the projection instruction device generates a second projection image indicating the sorting of the corresponding package and instructs the image projection device to project the second projection image instead of the first projection image.

10. The projection instruction system according to claim 9, wherein each time loading of the package, on which the second projection image is projected, onto a delivery vehicle is detected, the projection instruction device transmits the package identification information including capacity information on the corresponding package to the server, and wherein the server calculates a current occupied capacity of each of the plurality of delivery vehicles to different delivery destinations based on the package identification information transmitted from the projection instruction device, and generates a screen indicating a calculation result of the current occupied capacity of each of the plurality of delivery vehicles and displays the screen on a display device.

* * * * *